US011973955B2

(12) United States Patent
Sánchez De La Fuente et al.

(10) Patent No.: US 11,973,955 B2
(45) Date of Patent: Apr. 30, 2024

(54) VIDEO CODING IN RELATION TO SUBPICTURES

(71) Applicant: FRAUNHOFER-GESELLSCHAFT ZUR FÖRDERUNG DER ANGEWANDTEN FORSCHUNG E.V., Munich (DE)

(72) Inventors: Yago Sánchez De La Fuente, Berlin (DE); Karsten Sühring, Berlin (DE); Cornelius Hellge, Berlin (DE); Thomas Schierl, Berlin (DE); Robert Skupin, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 88 days.

(21) Appl. No.: 17/787,219

(22) PCT Filed: Dec. 18, 2020

(86) PCT No.: PCT/EP2020/086937
§ 371 (c)(1),
(2) Date: Jun. 17, 2022

(87) PCT Pub. No.: WO2021/123101
PCT Pub. Date: Jun. 24, 2021

(65) Prior Publication Data
US 2023/0054567 A1 Feb. 23, 2023

(30) Foreign Application Priority Data
Dec. 20, 2019 (EP) .................................... 19218973

(51) Int. Cl.
*H04N 19/00* (2014.01)
*H04N 19/136* (2014.01)
(Continued)

(52) U.S. Cl.
CPC ......... *H04N 19/136* (2014.11); *H04N 19/174* (2014.11); *H04N 19/184* (2014.11); *H04N 19/46* (2014.11)

(58) Field of Classification Search
CPC .. H04N 19/136; H04N 19/174; H04N 19/184; H04N 19/46
See application file for complete search history.

(56) References Cited

U.S. PATENT DOCUMENTS

2013/0272618 A1* 10/2013 Deshpande .......... H04N 19/124
382/232
2019/0098295 A1 3/2019 Merkle et al.
(Continued)

OTHER PUBLICATIONS

Boyce J et al: "High level syntax hooks for future extensions", 99. MPEG Meeting; Feb. 6, 2012-Feb. 10, 2012; San Jose; (Motion Picture Expert Group or ISO/IEC JTC1/SC29/WG11), No. m23263, Feb. 10, 2012 (submission pending).
(Continued)

*Primary Examiner* — Zhihan Zhou
(74) *Attorney, Agent, or Firm* — NIXON & VANDERHYE P.C.

(57) ABSTRACT

Concepts are described, including encoding, processing and decoding of a data stream having a video encoded thereinto, wherein the video comprises a plurality of pictures, wherein the data stream comprises a plurality of pictures in at least two layers, wherein the pictures of at least one layer are split into a predetermined layer-specific number of subpictures, one or more of the pictures or subpictures of one layer corresponds to one picture or subpictures in one or more other layer, and at least one of the subpictures comprises (Continued)

boundaries for boundary extension for motion compensation, and an indication that at least one of the boundaries of corresponding subpictures or corresponding pictures in different layers are aligned with each other.

13 Claims, 15 Drawing Sheets

(51) Int. Cl.
*H04N 19/174* (2014.01)
*H04N 19/184* (2014.01)
*H04N 19/46* (2014.01)

(56) References Cited

U.S. PATENT DOCUMENTS

| | | | | |
|---|---|---|---|---|
| 2021/0092454 | A1* | 3/2021 | Coban | H04N 19/70 |
| 2021/0409702 | A1* | 12/2021 | Wang | H04N 19/46 |
| 2022/0007014 | A1* | 1/2022 | Wang | H04N 19/176 |
| 2022/0182681 | A1* | 6/2022 | Paluri | H04N 19/176 |
| 2022/0279165 | A1* | 9/2022 | Jang | H04N 19/70 |
| 2022/0360782 | A1* | 11/2022 | Keating | H04N 19/174 |
| 2022/0360783 | A1* | 11/2022 | Keating | H04N 19/174 |
| 2022/0377344 | A1* | 11/2022 | He | H04N 19/105 |

OTHER PUBLICATIONS

Rong Zhang et al: "Efficient Inter-Layer Motion Compensation for Spatially Scalable Video Coding", IEEE Transactions on Circuits and Systems for Video Technology, Institute of Electrical and Electronics Engineers, US, vol. 18, No. 10, Oct. 1, 2008, pp. 1325-1334 (submission pending).
Fu Ting et al: "Fast CU Partitioning Algorithm for H.266/VVC Intra-Frame Coding", 2019 IEEE International Conference on Multimedia and Expo (ICME), IEEE, Jul. 8, 2019, pp. 55-60 (submission pending).
International Search Report for PCT/EP2020/086937 dated Apr. 15, 2021, 7 pages.
Written Opinion of the ISA for PCT/EP2020/086937 dated Apr. 15, 2021, 14 pages.

* cited by examiner

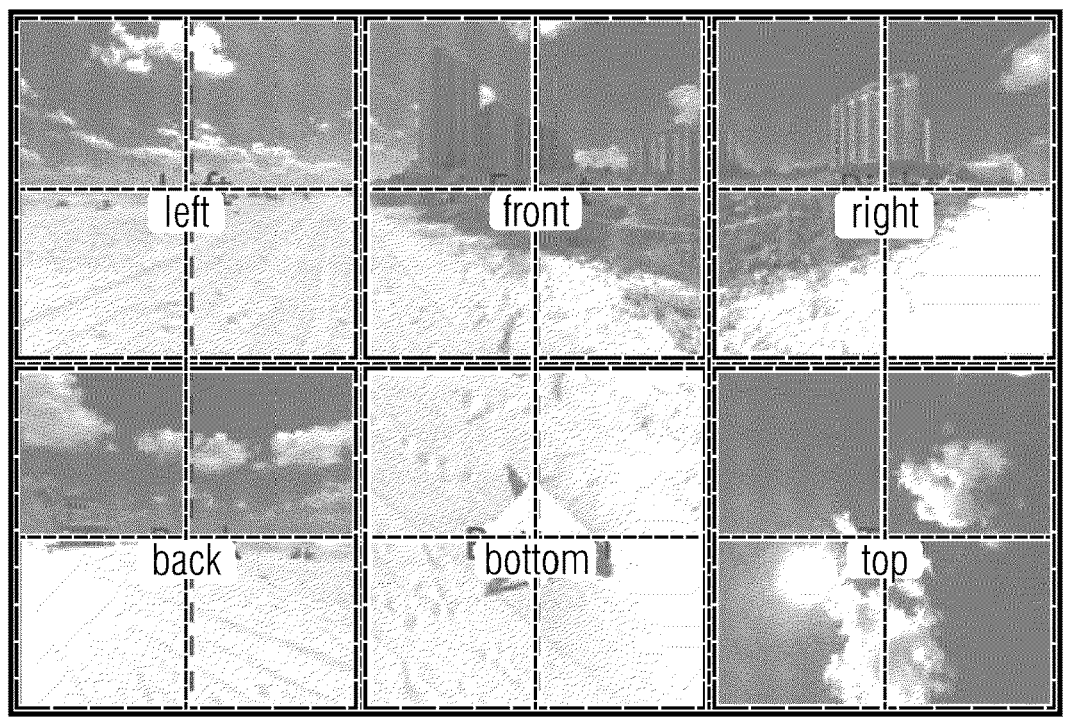
high resolution
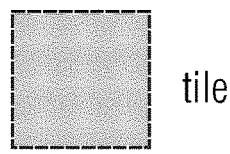
tile
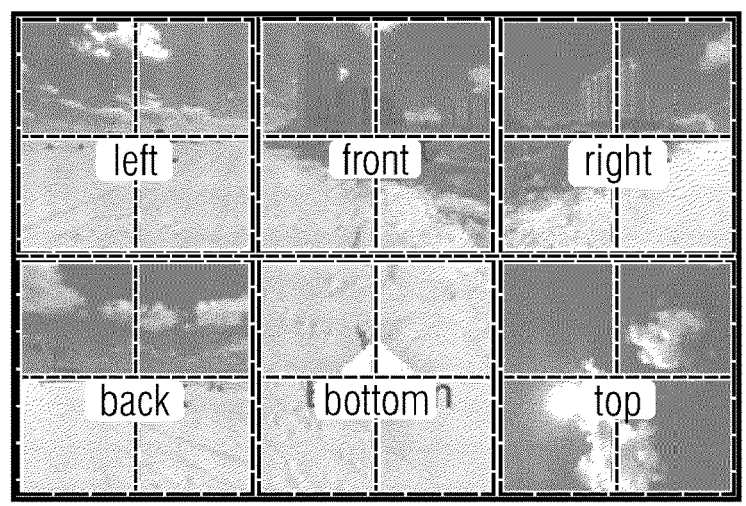
low resolution
Fig. 1

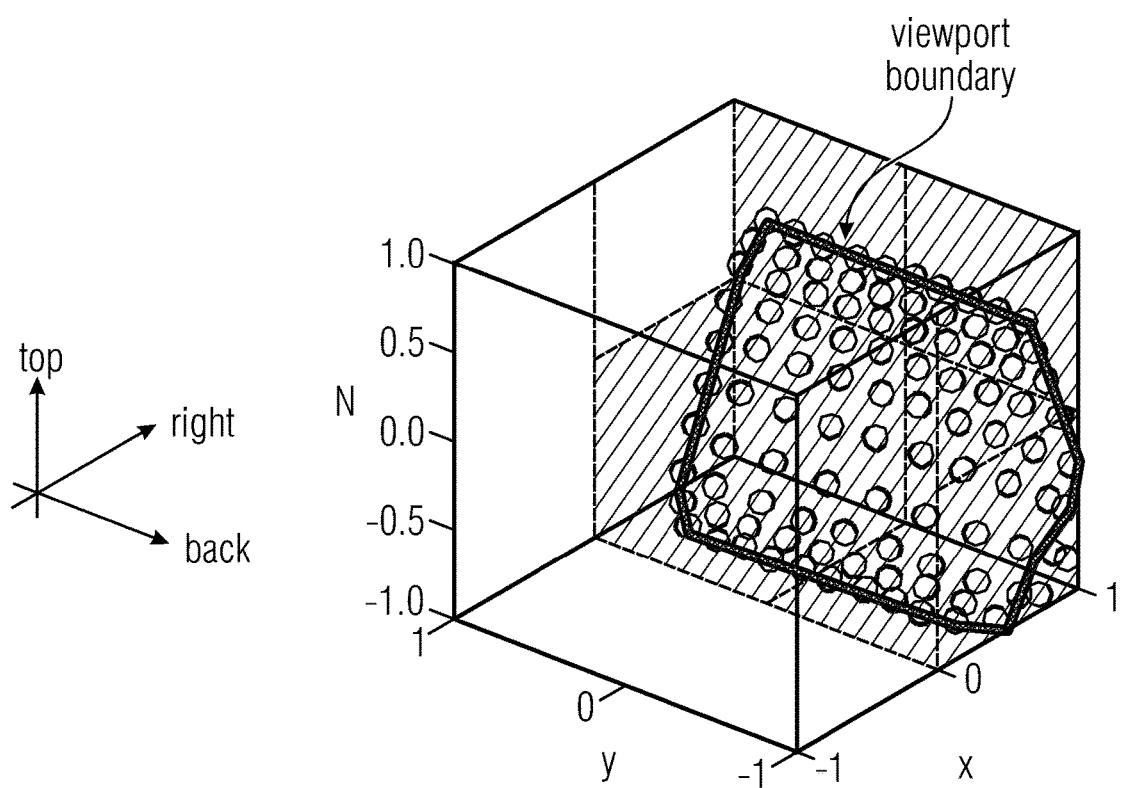
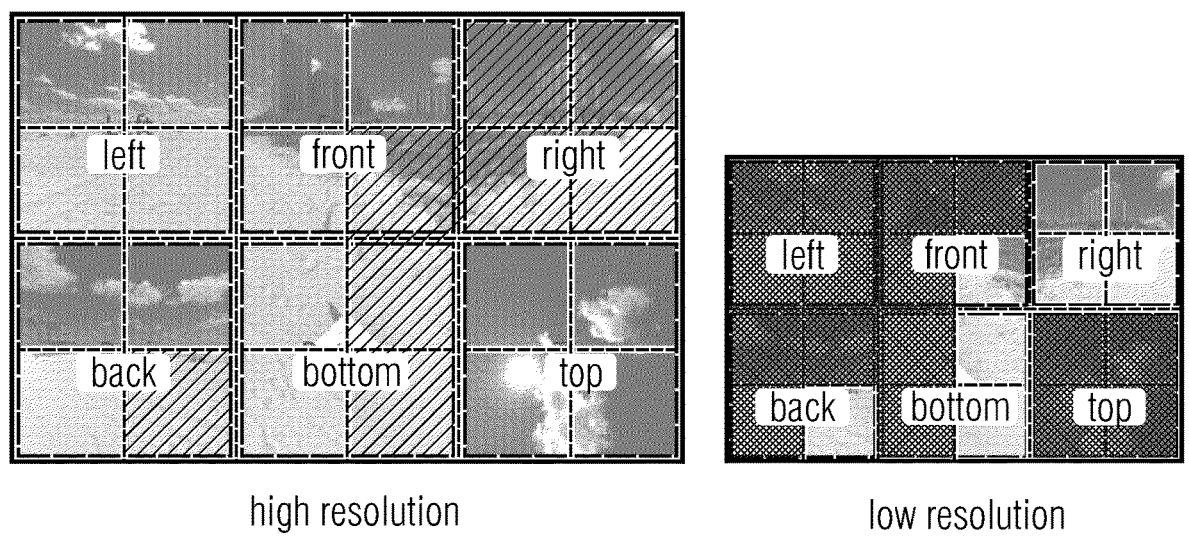
Fig. 2

| general_constraint_info( ) { | Descriptor |
|---|---|
| general_progressive_source_flag | u(1) |
| ... | |
| subpictures_in_ols_aligned_flag | u(1) |
| } | |

Fig. 5

| general_constraint_info( ) { | Descriptor |
|---|---|
| general_progressive_source_flag | u(1) |
| ... | |
| unique_subpictures_ids_in_ols_flag | u(1) |
| } | |

Fig. 6

| general_constraint_info( ) { | Descriptor |
|---|---|
| general_progressive_source_flag | u(1) |
| ... | |
| aligned_subpictures_ids_in_ols_flag | u(1) |
| } | |

Fig. 7

| seq_parameter_set_rbsp( ) { | Descriptor |
|---|---|
|    sps_decoding_parameter_set_id | u(4) |
|    ... | |
|    subpics_present_flag | u(1) |
|    if( subpics_present_flag ) { | |
|       sps_num_subpics_minus1 | u(8) |
|       for( i = 0; i <= sps_num_subpics_minus1; i++ ) { | |
|          subpic_ctu_top_left_x[ i ] | u(v) |
|          subpic_ctu_top_left_y[ i ] | u(v) |
|          subpic_width_minus1[ i ] | u(v) |
|          subpic_height_minus1[ i ] | u(v) |
|          subpic_treated_as_pic_flag[ i ] | u(1) |
|          loop_filter_across_subpic_enabled_flag[ i ] | u(1) |
|       } | |
|    } | |
|    ... | u(1) |

Fig. 8

Sequence Parameter Set

| sps_subpic_id_present_flag | u(1) |
|---|---|
| if( sps_subpics_id_present_flag ) { | |
|    sps_subpic_id_signalling_present_flag | u(1) |
|    if( sps_subpics_id_signalling_present_flag ) { | |
|       sps_subpic_id_len_minus1 | ue(v) |
|       for( i = 0; i <= sps_num_subpics_minus1; i++ ) | |
|          sps_subpic_id[ i ] | u(v) |
|    } | |
| } | |

Fig. 9

Picture Parameter Set

| | |
|---|---|
| pps_subpic_id_signalling_present_flag | u(1) |
| if( pps_subpics_id_signalling_present_flag ) { | |
|    pps_num_subpics_minus1 | ue(v) |
|    pps_subpic_id_len_minus1 | ue(v) |
|    for( i = 0; i <= pps_num_subpic_minus1; i++ ) | |
|       pps_subpic_id[ i ] | u(v) |
| } | |

Fig. 10

Picture Header

| | |
|---|---|
| if( sps_subpic_id_present_flag && !sps_subpic_id_signalling_flag ) { | |
|    ph_subpic_id_signalling_present_flag | u(1) |
|    if( ph_subpics_id_signalling_present_flag ) { | |
|       ph_subpic_id_len_minus1 | ue(v) |
|       for( i = 0; i <= sps_num_subpics_minus1; i++ ) | |
|          ph_subpic_id[ i ] | u(v) |
|    } | |
| } | |

Fig. 11

| general_constraint_info( ) { | Descriptor |
|---|---|
|    general_progressive_source_flag | u(1) |
|    ... | |
|    subpictures_in_ols_coherent_flag | u(1) |
| } | |

| video_parameter_set_rbsp( ) { | Descriptor |
|---|---|
| [...] | |
|   for( i = 0; i <= vps_max_layers_minus1; i++ ) { | |
|     vps_layer_id[ i ] | u(6) |
|     if( i > 0 && !vps_all_independent_layers_flag ) { | |
|       vps_independent_layer_flag[ i ] | u(1) |
|       if( !vps_independent_layer_flag[ i ] ) | |
|         for( j = 0; j < i; j++ ) | |
|           vps_direct_ref_layer_flag[ i ][ j ] | u(1) |
|     } | |
|   } | |
|   if( vps_max_layers_minus1 > 0 ) { | |
|     if( vps_all_independent_layers_flag ) | |
|       each_layer_is_an_ols_flag | u(1) |
|     if( !each_layer_is_an_ols_flag ) { | |
|       if( !vps_all_independent_layers_flag ) | |
|         ols_mode_idc | u(2) |
|       if( ols_mode_idc == 2 ) { | |
|         num_output_layer_sets_minus1 | u(8) |
|         for( i = 1; i <= num_output_layer_sets_minus1; i++) | |
|           for( j = 0; j <= vps_max_layers_minus1; j++ ) | |
|             ols_output_layer_flag[ i ][ j ] | u(1) |
|         reduced_subpic_reference_flag | u(1) |
|         num_sub_pic_ids | u(8) |
|         for (i = 0; i <= num_sub_pic_ids; i++ ) | |
|           subPicIdToDecodeForReference | u(v) |
|       } | |
|     } | |
|   } | |
|   [...] | |
| } | |

Fig. 17

| video_parameter_set_rbsp( ) { | Descriptor |
|---|---|
|   vps_video_parameter_set_id | u(4) |
|   … | |
|   vps_num_ptls | u(8) |
|   for( i = 0; i < vps_num_ptls; i++ ) { | |
|     if( i > 0 ) | |
|       pt_present_flag[ i ] | u(1) |
|     if( vps_max_sublayers_minus1 > 0 && !vps_all_layers_same_num_sublayers_flag ) | |
|       ptl_max_temporal_id[ i ] | u(3) |
|   } | |
|   while( !byte_aligned( ) ) | |
|     vps_ptl_byte_alignment_zero_bit /* equal to 0 */ | u(1) |
|   for( i = 0; i < vps_num_ptls; i++ ) | |
|     profile_tier_level( pt_present_flag[ i ], ptl_max_temporal_id[ i ] ) | |
|   for( i = 0; i < TotalNumOlss; i++ ) | |
|     if( NumLayersInOls[ i ] > 1 && vps_num_ptls > 1 ) { | |
|       ols_ptl_idx[ i ] | u(8) |
|       subpic_add_ptl_present_flag[ i ] | u(1) |
|       if(subpic_add_ptl_present_flag[ i ]) | |
|         subpic_add_ols_ptl_idx[ i ] | u(8) |
|   } | |
|   … | |
|   vps_extension_flag | u(1) |
|   if( vps_extension_flag ) | |
|     while( more_rbsp_data( ) ) | |
|       vps_extension_data_flag | u(1) |
|   rbsp_trailing_bits( ) | |
| } | |

Fig. 18

| subpic_ctu_top_left_x[ i ] | u(v) |
|---|---|
| subpic_ctu_top_left_y[ i ] | u(v) |
| subpic_width_minus1[ i ] | u(v) |
| subpic_height_minus1[ i ] | u(v) |

| slice_header( ) { | Descriptor |
|---|---|
|   slice_pic_order_cnt_lsb | u(v) |
|   if( subpics_present_flag ) | |
|     slice_subpic_id | u(v) |
|   ... | |

| slice_header( ) { | Descriptor |
|---|---|
|     slice_pic_order_cnt_lsb_plus1 | u(v) |
|     one_bit | u(1) |
|     if( subpics_present_flag ){ | |
|         slice_subpic_id_plus1 | u(v) |
|         one_bit | u(1) |
|     } | |
|     ... | |

Fig. 23

| slice_header( ) { | Descriptor |
|---|---|
|     slice_pic_order_cnt_lsb_plus1 | u(v) |
|     if( subpics_present_flag ){ | |
|         slice_subpic_id_plusVal | u(v) |
|         one_bit | u(1) |
|     } | |
|     ... | |

Fig. 24

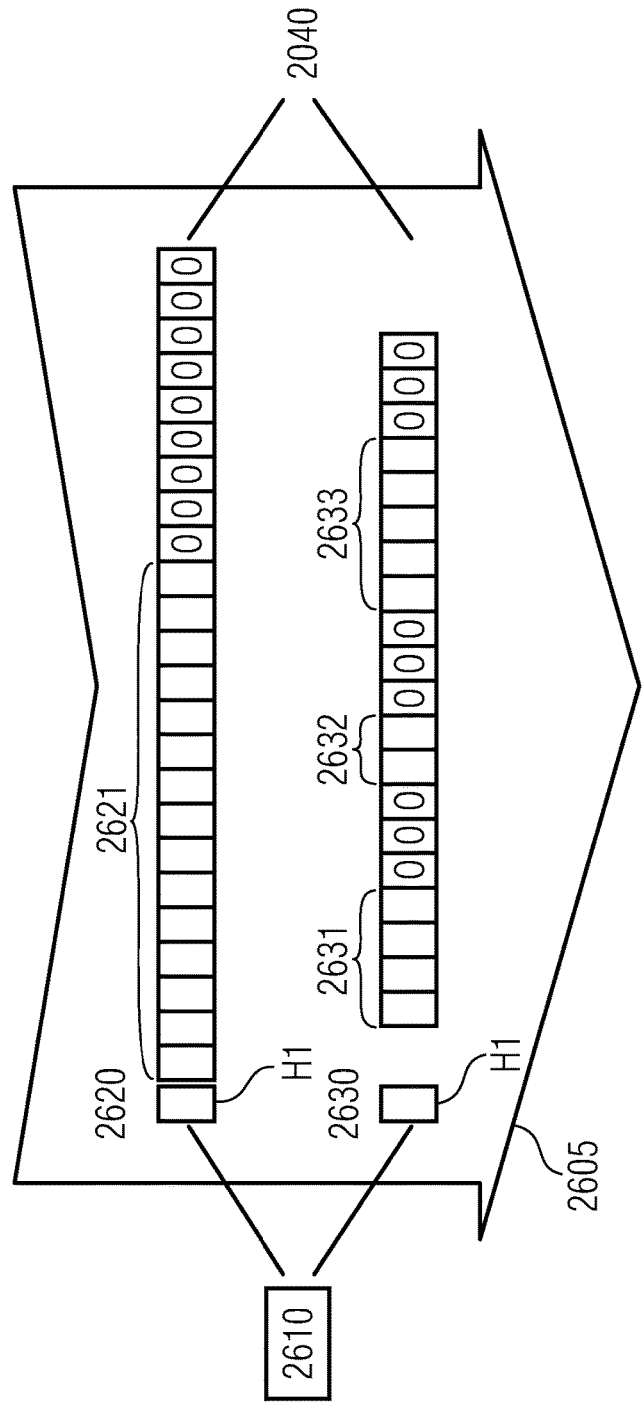

VIDEO CODING IN RELATION TO SUBPICTURES

This application is the U.S. national phase of International Application No. PCT/EP2020/086937 filed Dec. 18, 2020 which designated the U.S. and claims priority to EP Patent Application No. 19218973.6 filed Dec. 20, 2019, the entire contents of each of which are hereby incorporated by reference.

The present application is concerned with video coding concepts, and in particular with sub-pictures.

There exist certain video-based applications in which multiple coded video bitstreams, or data streams, are to be jointly decoded, e.g. merged into a joint bitstream and fed into a single decoder, such as multi-party conferencing, in which coded video streams from multiple participants are processed on a single end point, or tile-based streaming, e.g. for 360-degree tiled video playback in VR (virtual reality) applications.

For High Efficiency Video Coding (HEVC), motion-constraint tiles sets were defined, in which motion vectors were constraint to not reference tiles sets (or tiles) different than the current tiles set (or tile). Thus, the tiles set (or tile) in question could be extracted from a bitstream or merged into another bitstream without affecting to the result of decoding, e.g. the decoded samples would be an exact match irrespective of whether the tile set (or tile) in question is decoded alone or as part of a bitstream which has more tile sets (or tiles) for each picture.

In the latter, an example is shown 360-degree video, where such a technique is useful. The video is spatially segmented and each spatial segment is offered to streaming clients in multiple representations of varying spatial resolutions as illustrated in FIG. 1. The figure shows a cube map projected 360-degree video divided into 6×4 spatial segments at two resolutions. For simplicity, these independent decodable spatial segments are referred to as tiles in this description.

A user typically watches only a subset of the tiles constituting the entire 360-degree video when using state-of-the-art head-mounted-displays as illustrated at the left-hand side of FIG. 2 through a blue solid viewport boundary representing a Field of View of 90×90 degrees. The corresponding tiles, shaded in green in FIG. 2, are downloaded at highest resolution.

However, the client application will also have to download and decode a representation of the other tiles outside the current viewport, shaded in red in FIG. 2, in order to handle sudden orientation changes of the user. A client in such an application would thus download tiles that cover its current viewport in the highest resolution and tiles outside its current viewport in comparatively lower resolution while the selection of tile resolutions is constantly adapted to the orientation of the user. After download on client side, merging the downloaded tiles into a single bitstream to be processed with a single decoder is a means to address the constraints of typical mobile devices with limited computational and power resources. FIG. 3 illustrates a possible tile arrangement in a joint bitstream for the above examples. The merging operations to generate a joint bitstream has to be carried out through compressed-domain processing, e.g. avoiding processing on pixel-domain through transcoding.

The merging process can be carried out because the HEVC bitstreams are encoding following some constraints that mainly concern inter coding tools, e.g. constraining motion vectors as described above.

The emerging codec VVC provides other means to achieve the same goal that are more effective, namely sub-pictures. By means of sub-pictures, smaller regions than the full picture can be treated similar as pictures in the sense that their borders are treated as if they were pictures, e.g. applying boundary extension for motion compensation, e.g. if a motion vector points outside the region the last sample of the region (border that is crossed) is repeated to generate samples in the reference block used for prediction exactly like it is done at the picture boundary. Thereby, motion vectors are not constrained at the encoder like HEVC MCTS with the corresponding efficiency loss.

The emerging VVC coding standard envisions as well to provide scalable coding tools in its main profile for multi-layer support. Thus, a further efficient configuration for the above application scenario could be achieved by encoding the whole low-resolution content with less frequent RAPs. However, this would require the use of a layer coding structure that contains the low-resolution content always in the base layer and some high-resolution content in the enhancement layer. The layered coding structure is shown in FIG. 1.

However, still there might be interest for some use-cases to allow the extraction of a single region of the bitstream. For instance, users having higher end-to-end delays would download the whole 360-degree video in low resolution (all tiles), while users having lower end-to-end delays would download less tiles of the low-resolution content, e.g. the same number as downloaded high-resolution tiles.

Therefore, extraction of layered subpictures should be properly handled by a video coding standard. This requires additional signalling that ensures appropriate knowledge at the decoder- or the extractor-side.

It is, thus, the object of the present invention to provide this additional signalling, which improves the current available mechanisms.

This object is achieved by the subject-matter of the independent claims of the present application.

In accordance with a first aspect of the present application, a data stream is decoded into a plurality of pictures of a video, wherein the data stream comprises a plurality of pictures in at least two layers. Therein the pictures of at least one layer are split into a predetermined layer-specific number of subpictures, one or more of the pictures or subpictures of one layer corresponds to one picture or subpictures in one or more other layer, and at least one of the subpictures comprises boundaries for boundary extension for motion compensation. An indication therein is interpreted, in other words, decode or parse from the data stream, that at least one of the boundaries of corresponding subpictures or corresponding pictures in different layers are aligned with each other.

In accordance with a second aspect of the present application, a data stream of constant bitrate is processed, which has a plurality of pictures encoded thereinto in a manner according to which each of the plurality of pictures is split into a predetermined number of subpictures, each subpicture comprising boundaries for boundary extension for motion compensation. A subpicture data stream is produced from the data stream relating to at least one subpicture with a constant bitrate, by keeping dummy data which is included in the data stream for the at least one subpicture and removing dummy data included in the data stream for another subpicture to which the extracted data stream not relates.

In accordance with a third aspect of the present invention, subpicture extraction is performed on a data stream which has a plurality of pictures of a video encoded thereinto in a plurality of layers, wherein each of the plurality of pictures of all layers is split into a predetermined number of subpictures, each subpicture comprising boundaries for boundary extension for motion compensation. The subpicture extraction is performed on the data stream to an extracted data stream related to one or more subpictures of interest by dropping NAL units of the data stream not corresponding to the one or more subpictures and rewriting parameter sets and/or picture headers.

In accordance with a fourth aspect of the present invention, a plurality of pictures of a video is encoded into a data stream, wherein each of the plurality of pictures is split into a predetermined number of subpictures, each subpicture comprising boundaries for boundary extension for motion compensation. The plurality of pictures is encoded in units of slices and written into a slice header of the slices a first syntax element and a subpicture identification parameter, wherein the first syntax element and the subpicture identification parameter are written into the data stream in a manner increased by one, and separated by a bit, set to one, in the slice header of at least one of the slices.

In accordance with a fifth aspect of the present invention, a plurality of pictures of a video is encoded into a data stream, wherein each of the plurality of pictures is split into a predetermined number of subpictures, each subpicture comprising boundaries for boundary extension for motion compensation. The plurality of pictures is encoded in units of slices and write into a slice header of the slices a first syntax element and a subpicture identification parameter. Therein the first syntax element and the subpicture identification parameter are written into the data stream, so that the first syntax element is written at a first bit length and the subpicture identification parameter is written at a second bit length, in a manner so that the first syntax element precedes the subpicture identification parameter, in a manner so that the first syntax element is written into the data stream increased by one, and in a manner so that the subpicture identification parameter is written into the data stream increased by a certain value and followed by a bit, set to one.

The certain value is determined by checking if a sum of the first and second bit lengths is smaller than 31 bits, and setting the certain value to the value 1, if the sum of the first and second bit lengths is smaller than 31 bits, and setting the certain value to the value 4, if the sum of the first and second bit lengths is not smaller than 31 bits.

In accordance with a sixth aspect of the present invention, a plurality of pictures of a video is encoded into a data stream, wherein each of the plurality of pictures is split into a predetermined number of subpictures, each subpicture comprising boundaries for boundary extension for motion compensation. Each of the subpictures is encoded using context-adaptive binary arithmetic coding, wherein the video encoder is configured to provide the data stream for at least one subpicture at the end of one or more slices of each subpicture with zero-words so as to avoid that any of the subpictures exceeds a predetermined bin-to-bit ratio.

All above aspects are not restricted to encoding or decoding, the respective other one of encoding and decoding is based on the same principles. With respect to the aforementioned aspects of the present application, it is noted that same may be combined so that more than one of the aforementioned aspects such as all aspects are implemented in a video codec concurrently.

Preferred embodiments of the present application are described below with respect to the figures, among which:

FIG. 1 shows a 360-degree video in a cube map projection at two resolutions and tiled into 6×4 tiles;

FIG. 2 shows a user viewport and tile selection for 360-degree video streaming;

FIGS. 5 to 11 show exemplary syntax elements;

FIGS. 17 and 18 show exemplary syntax elements;

FIGS. 19 and 20 illustrates a data stream with constant bitrate, wherein subpictures are padded with dummy data, for subpicture extraction;

FIGS. 21 to 25 show exemplary syntax elements; and

FIG. 26 shows encoding with cabac zero words.

In the following, additional embodiments and aspects of the invention will be described which can be used individually or in combination with any of the features and functionalities and details described herein.

A first embodiment concerns layers and subpictures, and in particular subpicture boundary alignment (2.1).

It is signalled that subpicture boundaries are aligned across layers, e.g. the same number of subpictures are present per layer and the boundary of all subpictures is sample accurately collocated. This is for instance illustrated in FIG. 4. Such a signalling can be implemented for example, by a sps_subpic_treated_as_pic_flag. If this flag, sps_subpic_treated_as_pic_flag[i], is set, therefore has for example an value equal to 1, it is specified that the i-th subpicture of each coded picture in the coded layer-wise video sequence, CLVS, is treated as a picture in the decoding process excluding in-loop filtering operations. If the sps_subpic_treated_as_pic_flag[i] is not set, for example by having a value equal to 0, it is specified that the i-th subpicture of each coded picture in the CLVS is not treated as a picture in the decoding process excluding in-loop filtering operations. If the flag is not present, it can be considered to be set, e.g. the value of the sps_subpic_treated_as_pic_flag[i] is inferred to be equal to 1.

The signalling is useful for extraction, as an extractor/receiver can look for subpicture IDs, which are present in the slice header to drop all NAL units that do not belong to the subpictures of interest. When sub-pictures are aligned, the subpicture IDs are mapped one-to-one between layers. This means, for all samples in an enhancement layer sub-picture A, identified by a sub-picture ID An, the collocated samples in the base layer subpicture B belong to a single subpicture identified by subpicture ID Bn.

Note, that if there was no alignment as described there could be more than one subpicture in referenced layer for each subpicture at the referencing layer or even worse from perspective of bitstream extraction or parallelization: partial overlap of subpictures in layers.

In a specific implementation, the indication of subpicture alignment could be done by a constraint flag in the general_constraint_info( ) structure in profile_tier_level( ) indicated in the VPS, as this is a layer specific signalling. This is for instance illustrated in FIG. 5.

The syntax, allows indicating that layers within an output layer set (OLS) have aligned subpictures. Another option is to indicate for alignment for all layers in a bitstream, e.g. for all OLS, making the signalling OLS independent.

Figure 3:
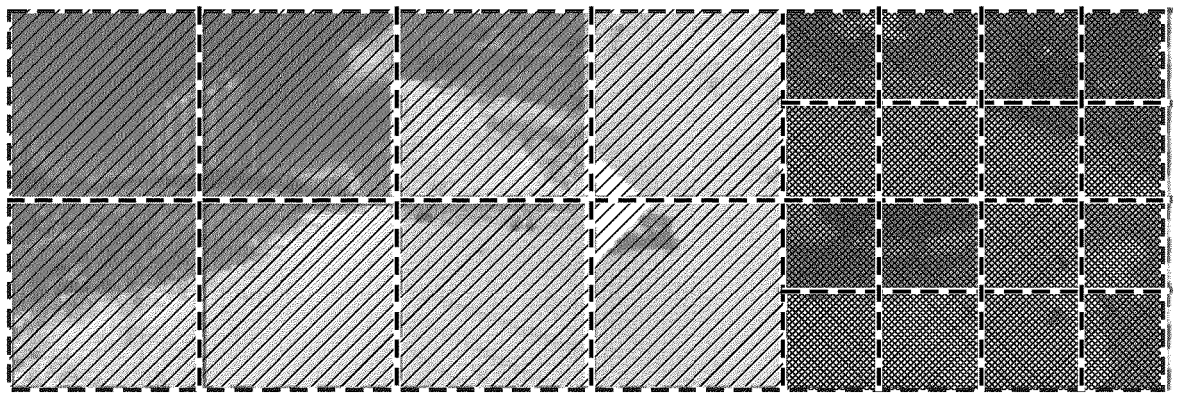
FIG. 3 shows a resulting tile arrangement (packing) in a joint bitstream after merging operation.
Figure 4:
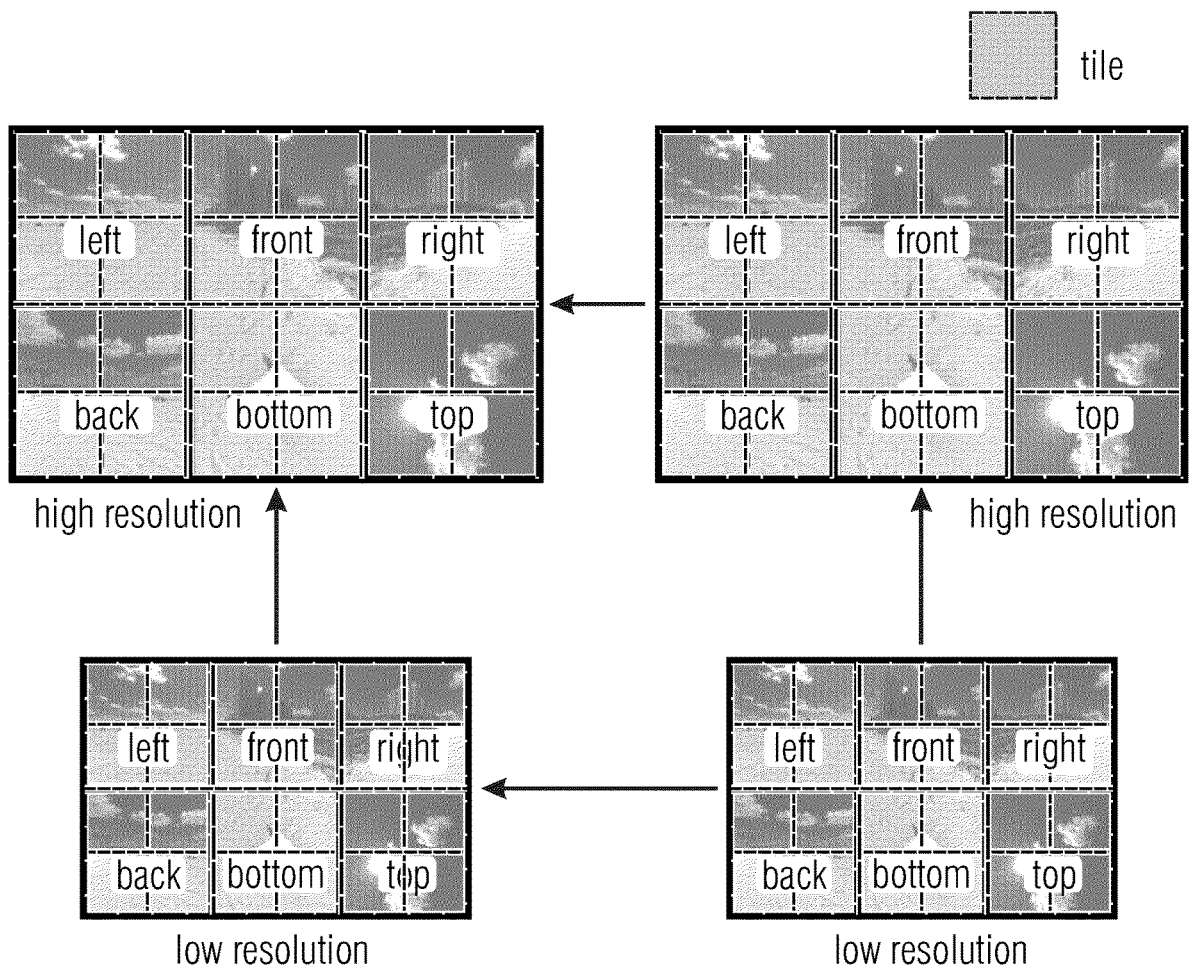
FIG. 4 shows a scalable subpicture based bitstream.

In other words, in this embodiment, a data stream is decoded into a plurality of pictures of a video, and the data stream comprises a plurality of pictures in at least two layers. In this example the one layer is the base layer ("low resolution" in FIG. 4) and the other layer is an enhancement layer ("high resolution" in FIG. 4). The pictures of both layers are split into subpictures, sometimes also called tiles, and, at least in the example of FIG. 4, each subpicture in the base layer has a corresponding subpicture in the enhancement layer. The boundaries of the subpictures shown in FIG. 4 are used for boundary extension for motion compensation. In decoding, there is an indication that is interpreted, that at least one of the boundaries of corresponding subpictures in different layers are aligned with each other. As a brief note it is noted that throughout the description herein subpictures of different layers are understood to be corresponding to each other due to their co-location, i.e. they are positioned at the same position within the picture they are part of. A subpicture is coded independent from any other subpicture within the same picture it is part of. A subpicture of a certain layer of, however, also a term describing mutually corresponding subpictures of pictures of that layer and these mutually corresponding subpictures are coded using motion compensation prediction and temporal prediction in a manner so that no coding dependency from regions outside these mutually corresponding subpictures is necessary and that, for instance, boundary extension is used for motion compensatedly referenced portions which are pointed to by motion vectors of blocks within these mutually corresponding subpictures, namely for portion of these referenced portions which extend beyond the subpicture boundary. The subdivision of the pictures of such a layer into subpictures is done in a manner so that subpictures overlaying each other mutually correspond to other and form a kind of independently coded sub-video. Note that subpictures may also act relating to inter-layer prediction. If inter-layer prediction is available for the coding/decoding, one picture of one layer may be predicted from another picture of a lower layer, both pictures being of the same time instant. An area referred to be one block of one picture of one layer, which extends beyond the boundary of the subpicture in the reference picture of another layer, to which the one block is collocated, i.e. with which the area is overlayed, is filled by boundary extension, i.e. by not using content from outside the collocated subpicture of the reference picture.

If the pictures are only split into one subpicture, that is the picture is treated as subpicture, the pictures correspond to each other across layers, the indication says that the boundaries of the pictures are aligned and they are used for boundary extension for motion compensation.

Each of the pluralities of pictures in the at least two layers can also be split into one or more subpictures, and the indication can be interpreted to the extent that all of the boundaries of corresponding subpictures in the different layers are aligned with each other.

The following concerns subpicture ID correspondence (2.2).

Besides the subpicture boundary alignment, it is also necessary to facilitate detection of the subpicture IDs that correspond to each other across layers in case the subpictures are aligned.

In the first option, the subpicture IDs in bitstream is distinct, e.g. each subpicture ID can be used in only one layer of the OLS. Thereby, each layer-subpicture is uniquely identifiable by its own ID. This is for instance illustrated in FIG. 6.

Note that this could also apply to IDs being unique for the whole bitstream, e.g. to any OLS in the bitstream, irrespective of whether two layers belong to one OLS or not. Therefore, in one embodiment, any subpicture ID value would be unique within a bitstream (e.g. unique_subpicture_ids_in_bitstream_flag).

In the second option, a subpicture in a layer carries the same ID value than its corresponding aligned subpicture in another layer (of the OLS or in the whole bitstream). This makes it very simple to identify corresponding sub-pictures just by matching the subpicture ID value. Also, the extraction process in simplified as only one ID per subpicture of interest is required at the extractor. This is for instance illustrated in FIG. 7. Instead of the aligned_subpictures_ids_in_ols_unique_flag also a SubpicIdVal constraint can be used.

The following concerns subpicture signalling order (2.3).

Dealing with the subpicture ID correspondence can be greatly simplified when signalling order of the subpicture ID, position and dimension is also constrained. This mean that when corresponding aligned subpictures and unique subpicture IDs are indicated (e.g. the flags subpictures_in_ols_aligned_flag and aligned_subpictures_ids_in_ols_unique_flag are set equal to 1), the definition of the subpictures (including location, width, height, treatment of borders, other properties) should be aligned across all SPS on the OLS.

For example the syntax element sps_num_subpics_minus1 should have the same value in a layer and all its reference layers as well as subpic_ctu_top_left_x[i], subpic_ctu_top_left_y[i], subpic_width_minus1[i], subpic_height_minus1[i], taking into account possible resampling factors.

In this embodiment, the order of the subpictures in the SPS (see green marking of the syntax elements in the SPS) of all the layers is constrained to be the same. This allows simple matching and verification of subpictures and their locations between the layers. This is for instance illustrated in FIG. 8.

Subpicture ID signalling can occur with respective overwriting functionality in SPS or PPS or PH as shown below and in case of aligned_subpictures_ids_in_ols_flag equal to 1, subpicture ID values should be the same in all layers. In case of unique_subpictures_ids_in_ols_flag equal to 1, subpicture ID values should not occur in more than a single layer. This is for instance illustrated in FIGS. 9 to 11.

In other words, in this embodiment, an indication is interpreted that relative subpicture positions and subpicture dimensions are the same for the corresponding subpictures in all layers. For example, the indices of syntax elements indicating position and dimensions of corresponding subpictures that represent a signalling order in the data stream are equal. The indication may comprise one flag per layer of the data stream, the flag indicating the subpicture alignment for layers including the layer for which the flag is present in the data stream and one or more higher layers such as those using any of the pictures of the layer of that flag as a reference picture.

Figure 12:
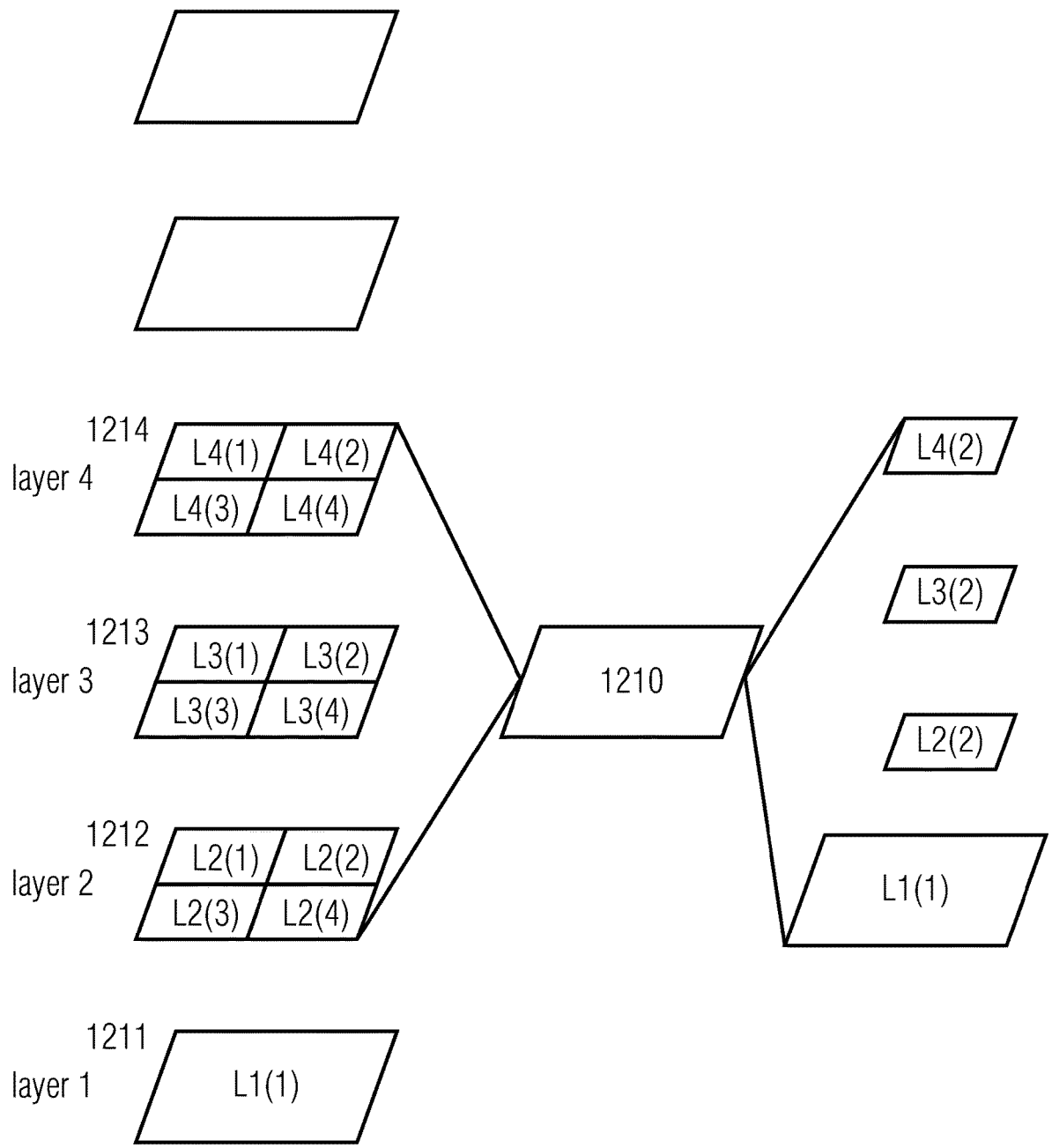
FIG. 12 illustrates pictures in different layers that are split into subpictures.

FIG. 12 illustrates this. Therein, pictures of the layers of a layered data stream are shown. The picture 1211 of layer 1 is exemplarily not split into subpictures, or, in other words, into one subpicture only, therefore there is (sub)picture L1(1). The picture 1212 of layer 2 is split into four subpictures L2(1) to L2(4). The picture of higher layers, here 3 to 4, are split in the same manner. Note that the pictures are coded using inter-layer prediction, i.e. inter-layer prediction is available for the coding/decoding. One picture of one layer may be predicted from another picture of a lower layer, both pictures being if the same time instant. Even here, the subpicture boundaries provoke boundary extension in inter-prediction, i.e. the area referred to be one block of one picture of one layer, which extends beyond the boundary of the subpicture in the reference picture of another layer, to which the one block is collocated, is filled by not using content from outside the collocated subpicture of the reference picture. Moreover, in each layer being subdivided into subpictures, the pictures might be required to be of constant size, meaning each layers' pictures do not vary in size, i.e. RPR is not used. For single-subpicture layers such as layer L1, the varying picture size and the application of RPR might be allowed. A flag of the indication may then indicate that the subpictures of layer 2 and above are aligned, as discussed above. That is, the pictures 1213, 1214 of the higher layers, layer 3 and above, have all the same subpicture divisioning as layer 2. The subpictures of layer 3 and above also have the same subpictures IDs as layer 3. Consequently, layers above layer 2 also have subpictures LX(1) to LX(4), where X is the number of the layer. FIG. 12 shows this exemplarily for some higher layers 3 and 4, but just one or more than two higher layers can also be present, and then the indication would also relate thereto. Thus, the subpictures of each layer above the layer for which the indication was made (here layer 2), i.e. the one for which the flag is set, have the same index, e.g. 1, 2, 3, or 4, as the corresponding subpicture in layer 2 and have the same size and collocated boundaries as the corresponding subpictures in layer 2. Corresponding subpictures are those being collocated to each other within the picture are. Again, such flags of the indication could also be present for each of the other layers and they could also be set for the higher layers here such as for layer 3 and layer 4 have the same subpicture subdivision.

When each of the pluralities of pictures in the at least two layers is split into one or more subpictures, the indication indicates for each of one or more layers, that the pictures of one or more higher layers, higher than the respective layer, are split into subpictures so that the predetermined layer-specific number of subpictures is equal for the respective layer and the one or more higher layers and the boundaries of predetermined layer-specific number of subpictures spatially coincide between the respective layer and the one or more higher layers.

In particular, if this is applied to the pictures of FIG. 12, it becomes clear that if it is indicated that the subpictures of layer 2 and above are aligned, layers 3 and above also have correspondingly aligned subpictures.

The one or more higher layers can use a picture of the respective layer for prediction.

Also, the IDs of the subpictures are the same between the respective layer and the one or more higher layers.

Also shown in FIG. 12 is a subpicture extractor 1210, which is for extracting from the bitstream into which the layer just-discussed are coded an extracted bitstream which his specific for a certain set of one or more subpictures of the layers 2-4. It extracts from the complete bitstream those portions which relate to the region of interest of the layered pictures, here exemplarily the subpicture the picture's upper right corner. Thus, extractor 1210 extracts those portions of the whole bitstream which relate to tie RoI, namely those relating to the whole picture of any layer for which the above-described indication does not indicate subpicture adjustment, i.e. for which the above-mentioned flag is not set, and those portions relating to the subpictures of pictures within the mutually aligned layers, i.e. the one for which the flag is set and any higher layer, which subpictures overlay the RoI, here exemplarily L2(2), L3(2), and L4(2). In other words, any single-subpicture layer such as L1 in case FIG. 12, which is in the Output Layer Set and which serves as reference for the subpicture layers, here 2-4, are included by the extractor 1210 into the extracted bitstream wherein, in the extracted bitstream, the HLS inter-layer prediction parameters are adjusted accordingly, namely terms of scaling window in order to reflect that in the extracted bitstream the erstwhile subpicture-subdivided higher layer pictures of layers 2-4 are smaller as they are cropped to the subpictures within the RoI only. The extraction is easy since the indication indicated that the subpictures are aligned with each other. Another way of exploiting the indication of subpicture alignment could be a decoder which more easily organises decoding.

The following concerns subpicture boundary subset in lower layer (2.4).

Figures 13, 14:
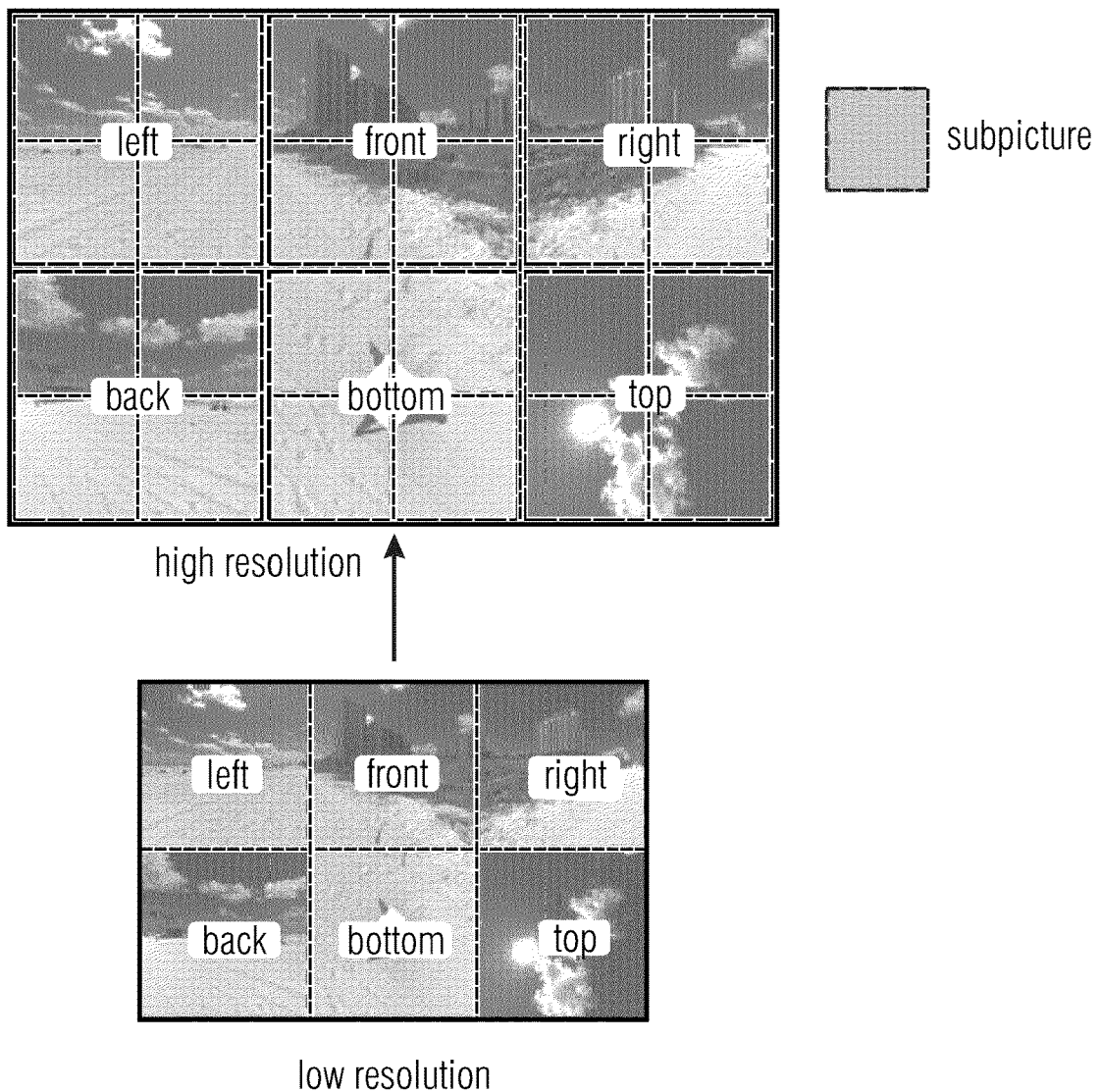
FIG. 13 shows boundaries that are aligned between lower and higher layers and boundaries of the higher layer that have no correspondence in the lower layer.
FIG. 14 shows exemplary syntax elements.

There might be other use-cases, such as fully parallel encoding of regions within layers for speed up encoding where the number of subpictures is larger for higher layers with a larger resolution (spatial scalability). In such cases, alignment would also be desirable. A further embodiment is that if the number of subpictures in a higher layer is higher than the number of subpictures in the lower (reference) layer, all subpicture boundaries in lower layers have counterparts at higher layers (co-located boundaries). FIG. 13 illustrates boundaries that are the aligned boundaries between lower and higher layer and boundaries of the higher layer that have no correspondence in the lower layer.

An exemplary syntax for signalling that property is shown in FIG. 14.

The following concerns subpicture boundary layered motion compensation prediction impact (2.5).

Figure 15:
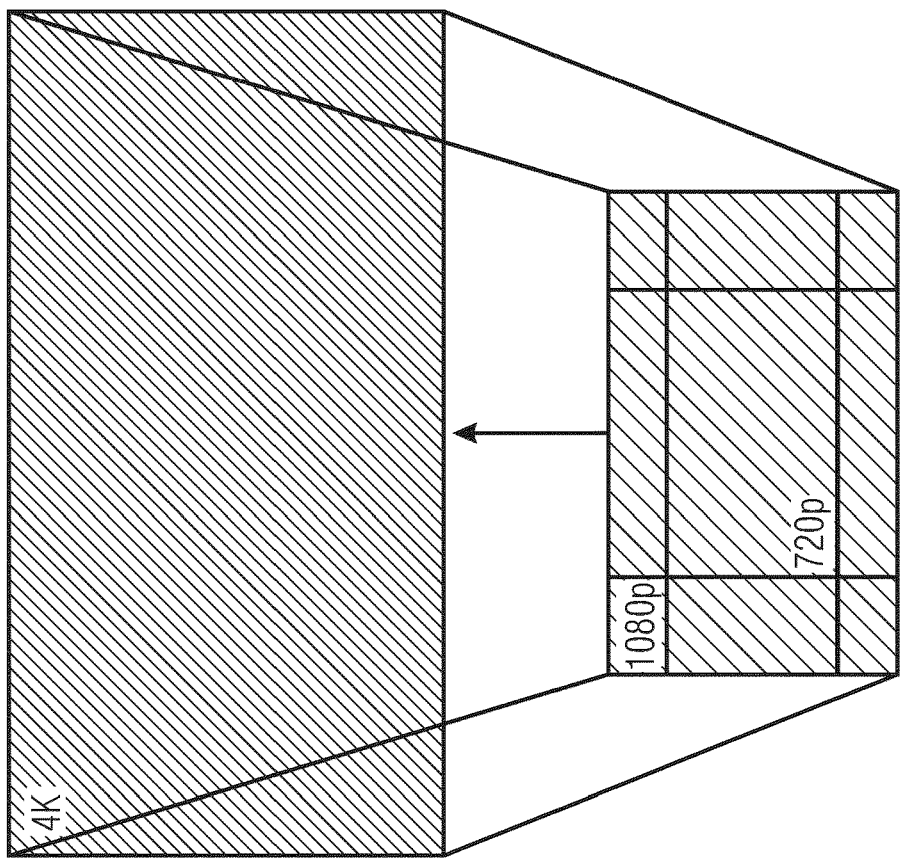
FIG. 15 shows an exemplary region of interest (RoI) that is offered in a low-resolution layer and not in a high-resolution layer.

There is an indication in the bitstream whether a subpicture is an independent subpicture only within a layer or also across layers. More concretely, the indication signalled whether motion compensated prediction that is carried out across layers also takes subpicture boundaries into account or not. One example could be when a RoI is offered in the low-resolution version (lower layer) of the content (e.g. 720p RoI within a 1080p content) and not in a high-resolution content (e.g. a higher layer with a 4 k resolution) as illustrated in FIG. 15.

In another embodiment, whether motion compensated prediction carried out across layers also takes subpicture boundaries into account or not is dependent on the fact whether the subpictures are aligned or not across layers. If yes, then the boundaries are taken in to account for motion comp for interlayer prediction, for instance, motion compensation is not allowed to use sample positions outside the boundaries or sample values of such sample positions are extrapolated from sample values within the boundaries. Otherwise, the boundaries are ignored for interlayer motion comp prediction.

The following concerns subpicture reduced reference OLS (2.6).

Figure 16:
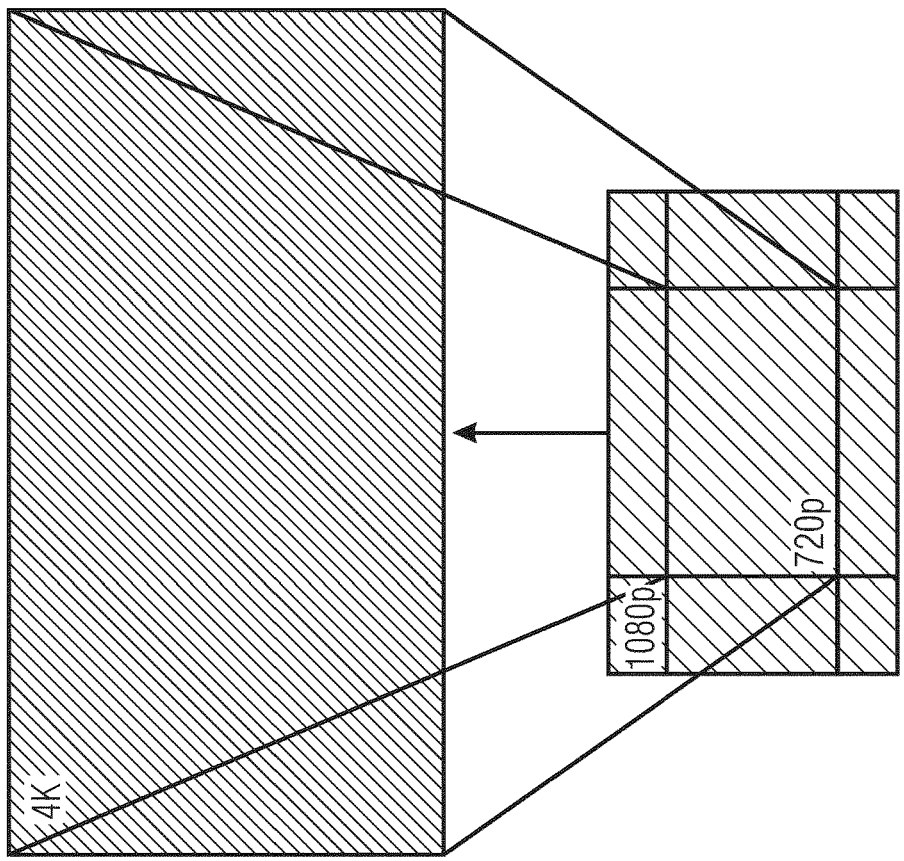
FIG. 16 shows an exemplary layer and subpicture configuration.

A further use-case that can be considered for the use of sub-pictures with layers is RoI scalability. An illustration of a potential layer and subpicture configuration for such a use-case is shown in the FIG. 16. In such a case only the RoI portion or subpicture in the lower layer is needed for the higher layer, which means that less samples are required to be decoded when only interested in the RoI, i.e. while decoding the 720p version in the base layer or the enhancement layer in the given examples. Still, it is necessary to indicate to the decoder, that only a subset of the bitstream needs to be decoded and that thus, the level of the sub-bitstream associated with the RoI is lower (less samples decoded) than the whole base layer and enhancement layer.

In the example, instead of 1080+4K, only 720+4K is required to be decoded.

In one embodiment, the OLS signalling indicates that one layer is not fully required, but only a subpicture thereof. For each output layer, when an indication is given (reduced_subpic_reference_flag equal to 1), a list of relevant subpictures ids used for reference is given (num_sub_pic_ids, subPicIdToDecodeForReference). This is for instance illustrated in FIG. 17.

In another embodiment, an additional PTL signalling is provided that indicates the PTL that would be required if the unnecessary subpictures of a layer within an OLS would be removed from the OLS bitstream. An option is shown in FIG. 18 in which the respective syntax is added to the VPS.

The following concerns constant bitrates (CBR) and sub-pictures (3).

According to an aspect, a video processing apparatus may be configured to process a plurality of pictures of a video decoded from a data stream comprising the plurality of pictures, wherein each of the plurality of pictures, e.g. of all layers, is split into a predetermined number of subpictures, each subpicture comprising boundaries for boundary extension for motion compensation, and wherein the video processing apparatus is configured to produce from the data stream at least one subpicture with a constant bitrate, by keeping dummy data, e.g. FD_NUT and filler payload supplemental enhancement information, SEI, messages which are included in the data stream for the subpicture immediately after the subpicture, or which are included in the data stream non-adjacent to the subpicture but with an indication of the subpicture, e.g. the subpicture identification, until another subpicture occurs in the data stream. Note that the pictures this coded may relate to one layer in case of the data steam being a layered data stream, and that the subpicture wise bitrate-control may be applied to each layer.

According to another aspect, a video encoder may be configured to encode a plurality of pictures of a video into a data stream comprising the plurality of pictures, wherein each of the plurality of pictures of all layers is split into a predetermined number of subpictures, each subpicture comprising boundaries for boundary extension for motion compensation, and wherein the video encoder is configured to encode into the data stream at least one subpicture with constant bitrate, by including into the data stream dummy data, e.g. FD_NUT and filler payload supplemental enhancement information, SEI, messages, for each subpicture immediately after each subpicture or non-adjacent to the subpicture but with an indication of the subpicture, e.g. the subpicture identification.

According to another aspect, a method for processing a video may have the steps of: processing a plurality of pictures of a video decoded from a data stream comprising the plurality of pictures, wherein each of the plurality of pictures, e.g. of all layers, is split into a predetermined number of subpictures, each subpicture comprising boundaries for boundary extension for motion compensation, and wherein the method comprises producing from the data stream at least one subpicture with a constant bitrate, by keeping dummy data, e.g. FD_NUT and filler payload supplemental enhancement information, SEI, messages which are included in the data stream for the subpicture immediately after the subpicture, or which are included in the data stream non-adjacent to the subpicture but with an indication of the subpicture, e.g. the subpicture identification, until another subpicture occurs in the data stream.

According to another aspect, a method for encoding a video may have the steps of: encoding a plurality of pictures of a video into a data stream, wherein the data stream comprises a plurality of pictures, wherein each of the plurality of pictures, e.g. of all layers, is split into a predetermined number of subpictures, each subpicture comprising boundaries for boundary extension for motion compensation, and wherein the method comprises encoding into the data stream at least one subpicture with constant bitrate, by including into the data stream dummy data, e.g. FD_NUT and filler payload supplemental enhancement information, SEI, messages, for each subpicture immediately after each subpicture or non-adjacent to the subpicture but with an indication of the subpicture, e.g. the subpicture identification.

There are cases when the bitstream containing subpicture is encoded and the associated HRD syntax elements define a Constant Bitrate (CBR) bitstream, e.g. at least for one scheduling value the cbr_flag is set to 1 indicating that the bitstream corresponds to a constant bitrate bitstream often by usage of so called Filler Data VCL NAL units or Filler Payload SEI (non-VCL NAL units), e.g. FD_NUT and filler payload SEI message.

However, when subpicture bitstreams are extracted, it is not clear whether this property still applies.

In one embodiment, the extraction process of a subpicture is defined in a way that always results in a VBR bitstream. There is no possibility of indicating/ensuring a CBR case. In that case, the FD_NUT and filler payload SEI message are simply discarded during the extraction process.

In another embodiment, it is indicated in the bitstream that the CBR "operation point" for each subpicture is ensured by placement of the respective FD_NUTs and Filler Payload SEI messages right after the VCL NAL units constituting the subpicture and therefore, during extraction of the CBR "operation point" of a subpicture, the respective FD_NUTs and filler payload SEI messages associated with a subpicture VCL NAL units are kept when the subpicture sub-bitstream is extracted during the extraction process and are during the extraction process when the extraction process targets another subpicture or a non-CBR "operation point". Such an indication can for example be performed with a sli_cbr_constraint_flag. Thus, for example, when the sli_cbr_constraint_flag is equal to 0, all NAL units with nal_unit_type equal to FD_NUT and SEI NAL units containing filler payload SEI messages are removed.

The described process requires to keep a state of the VCL NAL units and their associated non-VCL NAL units as in order to know whether a FD_NUT or a Filler Payload SEI message is dropped it is required to know what was the subpicture ID of the directly preceding VCL NAL unit. To ease this process, signalling is added to the FD_NUT and Filler Payload SEI that indicate that they belong to a given subpicture ID. Alternatively, in another embodiment, an SEI message in added to the bitstream that indicates that following SEI messages or NAL units belong to a given subpicture with subpicture ID up to the presence of another SEI message that indicates another subpicture ID.

In other words, a data stream of constant bitrate is processed which has a plurality of pictures encoded thereinto, in a manner according to which each of the plurality of pictures is split into a predetermined number of subpictures, each subpicture comprising boundaries for boundary extension for motion compensation, and, by the processing, a subpicture data stream relating to at least one subpicture with a constant bitrate is produced from the data stream, by keeping dummy data which is included in the data stream for the at least one subpicture and removing dummy data included in the data stream for another subpicture to which the extracted data stream not relates.

Figure 19:
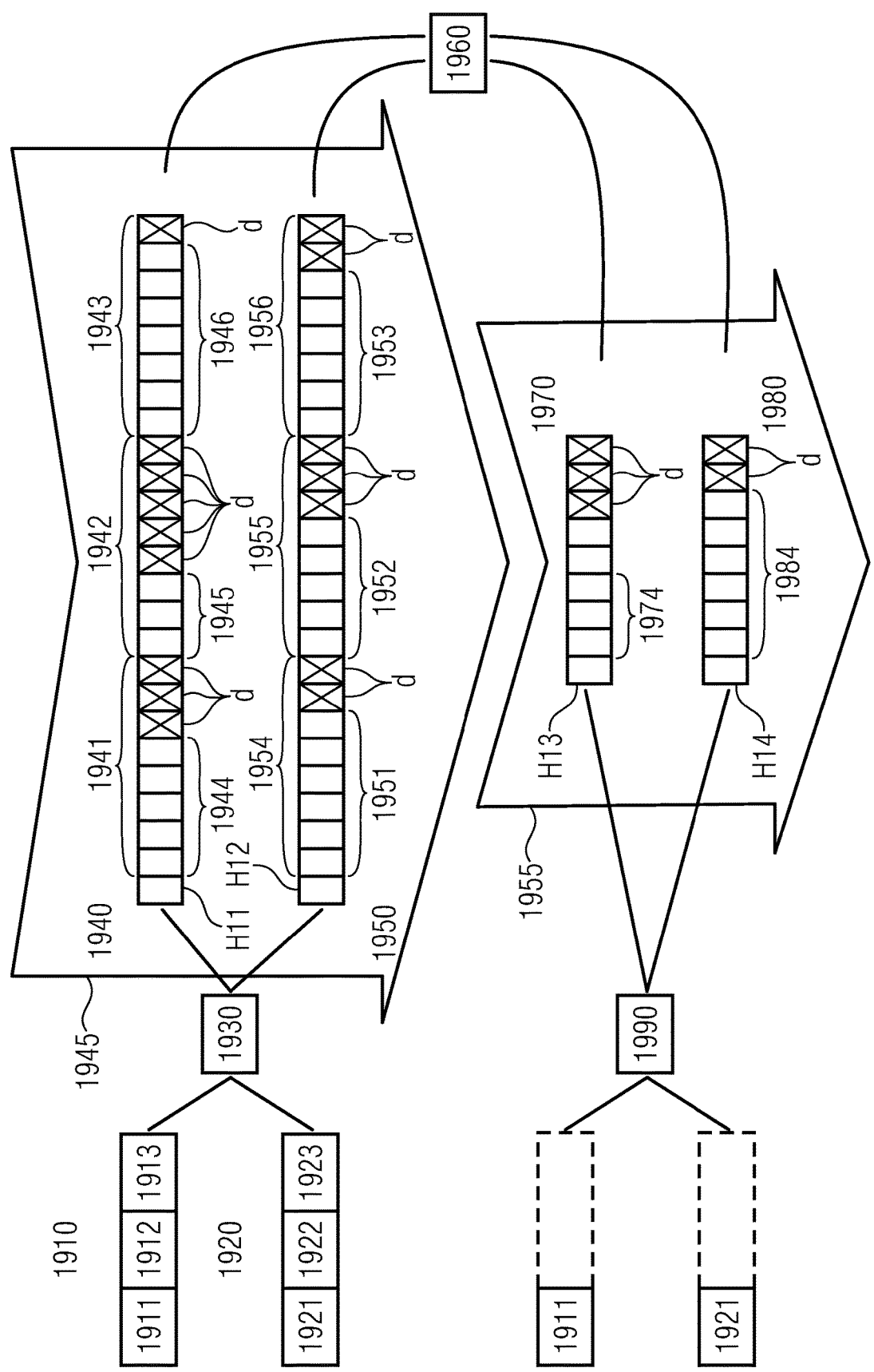
Figures 20, 21, 22:
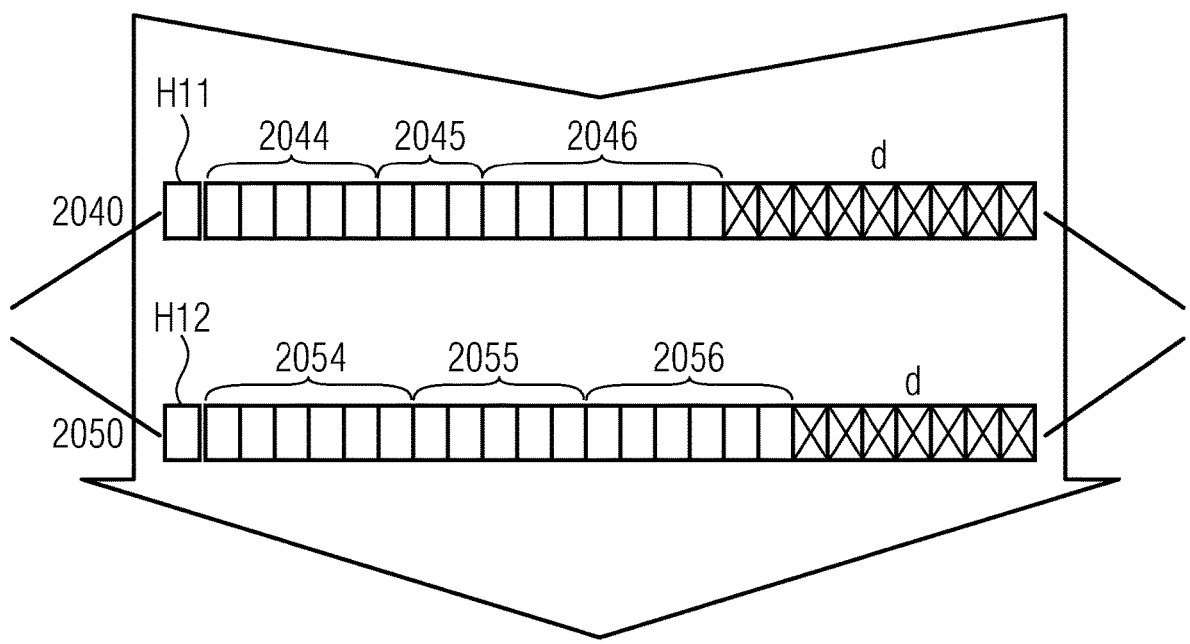

This can be seen in FIGS. 19 and 20, where exemplarily two pictures 1910 and 1920 of the video are shown which is coded into the processed data stream. The pictures are split into subpictures 1911, 1912, 1913, and 1921, 1922, and 1923, respectively, and are encoded into corresponding access units 1940 and 1950 of bitstream 1945 by some encoder 1930.

The subdivisioning into subpictures is shown merely illustratively. For illustration purposes, the AUs, access units, are shown to also comprise some header information portions, HI1 and HI2, respectively, but this is merely for illustration, and the pictures are shown to be coded into the bitstream 1945 fragmented into several portions, such as VCL NAL units, 1941, 1942, 1943, 1951, 1952, and 1953, respectively, so that, for each subpicture of pictures 1940 and 1950, one VCL unit exists, but this is done merely for illustration purposes and one subpicture may by fragmented/coded into more than one such portion or VCL NAL unit.

The encoder creates a constant bitrate data stream by including dummy data d at the end of each data portion representing a subpicture, i.e. resulting into dummy data 1944, 1945, 1946, 1954, 1955, and 1956 for each subpicture. Dummy data is illustrated using crosses in FIG. 19. Therein, dummy data 1944 corresponds to subpicture 1911, 1945 corresponds to subpicture 1912, 1946 corresponds to subpicture 1913, 1954 corresponds to subpicture 1921, 1955 corresponds to subpicture 1922, and 1956 corresponds to subpicture 1923. It could be that for some subpictures, no dummy data is needed.

Optionally, as said, a subpicture could also be distributed over more than one NAL unit. In this case, the dummy data can either be inserted at the end of each NAL unit or at the end of the last NAL unit for that subpicture.

The data stream 1945 of constant bitrate may then be processed by a subpicture extractor 1960, which as an example, extracts the information related to subpicture 1911 and corresponding subpicture 1921, i.e. mutually corresponding, since collocated, subpictures of the video coded in the bitstream 1945. The extracted set of subpictures could be more than one. The extraction results into an extracted bitstream 1955. For extraction, the NAL units 1941 and 1951 of the extracted subpicture 1911/1921 are extracted and taken over into the extracted bitstream 1955, while the other VCL NAL units of the other subpictures, not to be extracted are disregarded or dropped, and only the corresponding dummy data d for the extracted subpicture (2) are taken over into the extracted bitstream 1955, while the dummy data of all other subpictures is dropped, too. That is, for the other VCL NAL units, the dummy data d is removed. Optionally, the header portions HI3 and HI4 might be modified as detailed below. They may relate to, or comprise, parameter sets such as PPS and/or SPS and/or VPS and/or APS The extracted bitstream 1955, thus, comprises access units 1970 and 1980 corresponding to access units 1940 and 1950 of bitstream 1945 and is of constant bitrate. The bitstream thus produced by the extractor 1960 can then be decoded by decoder 1990 to produce a subvideo, namely a video comprising subpictures composed of only the extracted subpictures 1911 and 1921. The extraction may, naturally, affect more than one subpicture of the pictures of the video of bitstream 1945.

As another alternative, regardless of whether one or more subpictures are coded into one or more than one NAL unit, the dummy data could be ordered within each access unit at the end thereof, but in a manner so that each dummy data is associated with a corresponding subpicture coded into the respective access unit. This is illustrated in FIG. 20 with naming access units 2040 and 2050 instead of 1940 and 1950.

Note, that dummy data may be NAL units of a certain NAL unit type so as to be distinguishable from the VCL NAL units.

An alternative way of getting bitstream 1945 as being of constant bitrate may also be explained in FIG. 20, but here the constant bitrate is not made per subpicture. Rather, it is made globally. The dummy data can here be altogether be included for all subpictures at the end of an AU, as shown in FIG. 20, which illustratively only shows the data stream portions in correspondence with FIG. 19. Therein, in the access units 2040 and 2050 the data portions that represent a subpicture, 2044, 2045, 2046, 2054, 2055, and 2056, respectively, follow each other directly, and the dummy data is appended at the end of the subpictures, at the end of the respective access unit.

It could be indicated in the bitstream to be processed by an extractor whether subpicture selective dummy data removal is to be performed or not, i.e. whether all dummy data should be stripped of when extracting a subpicture bitstream, or whether the dummy data of the subpicture(s) of interest, i.e. to be extracted, should be kept as shown in FIG. 19.

Also, if a data stream is indicated to be not of subpicture-wise constant bitrate, the extractor 1960 can remove all dummy data d for all NAL units and the resulting extracted sub-picture bitstream is not of constant bitrate.

Note that the arrangement of dummy data may in the access units may by modified relative to the examples just discussed and that they may be placed in-between the VCL units or at the beginning of the access units.

It should be noted that the above and below described processes of a processing apparatus or extractor 1960 can also be performed by a decoder, for example.

In other words, the data stream can be processed with interpreting, e.g. decode and parse, an indication that an extractible set of at least one of the subpictures of the data stream is extractible in a manner so that the extracted subpicture bitstream is of constant bitrate. This indication can for example be processed from, or be contained in, a video parameter set, VPS, or in an SEI message and can for example be a cbr_flag, or a sli_cbr_constraint_flag.

The data stream can also be processed with interpreting an indication that an extractible set of one or more subpictures of the data stream is not coded at constant bitrate, with the indication being e.g. in a video parameter set, VPS, or in an SEI message and if so indicated all dummy data is removed.

As said, dummy data may include FD_NUT, special NAL units. Additionally or alternatively, dummy data may comprise filler payload supplemental enhancement information, SEI, messages.

The data stream can also be processed with interpreting, e.g. decoding, an indication from the data steam for the production of the extracted data stream whether the production shall end-up into the extracted data stream being of constant bitrate in which case the video processing apparatus performs the keeping and removal of the dummy data or whether the production shall not end-up into the extracted data stream being of constant bitrate in which case the video processing apparatus performs removal of all dummy data.

Finally, the aforementioned dummy data can, for example, comprise FD_NUT and filler payload supplemental enhancement information, SEI, messages.

The following concerns subpicture extraction completion: Parameter Set rewriting (4).

According to another aspect, a video processing apparatus may be configured to perform subpicture extraction on a data stream comprising a plurality of pictures of a video, wherein each of the plurality of pictures of all layers is split into a predetermined number of subpictures, each subpicture comprising boundaries for boundary extension for motion compensation, and interpret an indication in the data stream that rewriting parameter sets and/or picture headers of the data stream is allowed when performing the subpicture extraction on the data stream.

According to another aspect when referring to the previous aspect, the video processing apparatus may be further configured to interpret indications in the data stream which provide additional information for rewriting information on HRD related information, picture size and/or a subdivisioning of the plurality of pictures into the subpictures.

According to still another aspect, a video encoder may be configured to encode a plurality of pictures of a video into a data stream, wherein the data stream comprises a plurality of pictures, wherein each of the plurality of pictures of all layers is split into a predetermined number of subpictures, each subpicture comprising boundaries for boundary extension for motion compensation, and indicate in the data stream, that rewriting parameter sets and/or picture headers of the data stream is allowed when performing subpicture extraction on the data stream.

According to another aspect when referring back to the previous aspect, the video encoder may be further configured to indicate in the data stream additional information for rewriting information on HRD related information, picture size and/or a subdivisioning of the plurality of pictures into the subpictures.

According to another aspect, a method for processing a video may have the steps of: performing subpicture extraction on a data stream comprising a plurality of pictures of a video, wherein each of the plurality of pictures of all layers is split into a predetermined number of subpictures, each subpicture comprising boundaries for boundary extension for motion compensation, and interpreting an indication in the data stream that rewriting parameter sets and/or picture headers of the data stream is allowed when performing the subpicture extraction on the data stream.

According to another aspect when referring back to the previous aspect, the method for processing a video may further have the step of: interpreting indications in the data stream which provide additional information for rewriting information on HRD related information, picture size and/or a subdivisioning of the plurality of pictures into the subpictures.

According to another aspect, a method for encoding a video may have the steps of: encoding a plurality of pictures of a video into a data stream, wherein the data stream comprises a plurality of pictures, wherein each of the plurality of pictures of all layers is split into a predetermined number of subpictures, each subpicture comprising boundaries for boundary extension for motion compensation, and indicating in the data stream, that rewriting parameter sets and/or picture headers of the data stream is allowed when performing subpicture extraction on the data stream.

According to another aspect when referring to the previous aspect, the method for encoding a video may further have the step of: indicating in the data stream additional information for rewriting information on HRD related information, picture size and/or a subdivisioning of the plurality of pictures into the subpictures.

Another aspect may refer to a data stream into which a video is encoded, wherein the video comprises a plurality of pictures, wherein each of the plurality of pictures of all layers is split into a predetermined number of subpictures, each subpicture comprising boundaries for boundary extension for motion compensation, and an indication that rewriting parameter sets and/or picture headers of the data stream is allowed when performing subpicture extraction on the data stream.

Typically, the bitstream extraction process has been specified as follows for (sub-)layers:
Drop NAL units not corresponding to the (sub-)layers of interest
Drop SEI messages (such as Picture Timing SEI, Buffering Period SEI . . . )
Optionally get proper SEI messages from a nesting SEI message associated with the (sub-)layers of interest However, as discussed above, dropping NAL units at a finer granularity than per (sub-)layer, e.g. in subpicture extraction, can introduce so-far unsolved issues. For examples see the description of FD_NUTs for CBR above. Another issue arises from Parameter Sets. In (sub-)layer extraction, Parameters sets would potentially contain additional information not relevant for extracted the (sub-)layers, e.g. they would contain some information for (sub-)layers that have been dropped, but they would be correct, in the sense that they still describe the (sub-)layers in the extracted sub-bitstream. That additional information for the dropped (sub-)layers can be just ignored. When it comes to subpicture extraction, this design principle is too complicated to be maintained which is why, for instance, in HEVC, MCTS-nesting SEI messages carry replacement parameter sets. In VVC, however, picture headers are defined which further complicate the situation and make a HEVC-style solution with nesting SEI messages infeasible.

Therefore, the parameter sets are changed when carrying out subpicture extraction. Note that the parameter sets contain information such as picture size, profile_level information, tiling/slicing grid (could be also present at picture header), that requires changes when subpicture extraction is carried out.

In one embodiment the extraction process is defined as:
Drop NAL units not corresponding to the subpictures of interest
Drop SEI messages (such as Picture Timing SEI, Buffering Period SEI . . . )
Get proper SEI messages from a nesting SEI message associated with the (sub-)layers of interest
Drop parameter sets
Add proper parameter sets
Drop Picture Header
Add proper picture header The "proper" parameter sets and picture headers need to be generated, most likely by rewriting the pre-extraction parameter sets and picture headers.

The information required to be changed is:
Level and HRD related
Picture size
Tiling/slice/subpicture grid The resulting level and HRD-related information can be extracted from the respective SEI message (Subpicture level information SEI message) to be used in rewriting the parameter sets.

The resulting picture size can be easily derived if there is a single subpicture extracted in the process as the size of each subpicture is easily found in the SPS. However, when more than one subpicture is extracted from a bitstream, e.g. the resulting bitstream has more than one subpicture in it, the resulting picture size depends on the arrangement defined by external means.

In one embodiment, a bitstream constrained that only extraction of subpictures that correspond to a rectangular region in the original bitstream is allowed and that their relative arrangement in the original bitstream is kept unchanged. Thus, no reordering or gaps within the extracted regions are allowed.

The subpicture coordinates are currently defined by parameters as illustrated in FIG. 21, that describe the top_left coordinates and a width and height. Thereby the top-left, top-right, bottom-left and bottom-right corners or a region can be derived easily. Thus, the extraction process runs over all extracted subpictures and updates a minimum "x" and "y" coordinates of the top_left coordinates if a smaller one is found (e.g. search for the minimum value) and updates a maximum value "x" and "y" coordinates of the bottom-right coordinates if a smaller one is found (e.g. search for the maximum value). E.g., stream not corresponding to the one or more subpictures and rewriting parameter sets and/or picture headers.

Let's illustrate this again with respect to FIG. 19. Subpictures 1912, 1913, 1922, 1923 are not needed by the subpicture extractor 1960 because they do not belong to the subpicture(s) of interest, and the corresponding NAL units 1942, 1943, 1952, 1953 can be dropped altogether by the extraction. This time, the existence of dummy data in FIG. 19 shall be understood to be optional or, if present, same may by subpicture unspecific as explained in FIG. 20.

In the example now described with respect to FIG. 19, however, the extractor 1960 can rewrite header information HI1 and HI2 into HI3 and HI4, respectively. In this process, which can be done simultaneously when extracting subpictures, the header information, which can for example be a video parameter set, VPS, and/or sequence parameter set, SPS, and/or picture parameter set, PPS, or the like, can be modified by rewriting particular variable values thereof.

Information for rewriting can be derived from the data stream and be present in the data stream in addition to the actual header information HI1 and HI2, the additional information may relate to HRD related information, picture size and/or a subdivisioning into subpictures. An indication that the rewriting is allowed or that additional is present, and/or the additional information, can be indicated in the data stream, e.g. with a supplemental enhancement information, SEI, message.

```
MinTopLeftX=PicWidth
MinTopLeftY= PicHeight
MaxBottomRightX=0
MaxBottomRightY=0
For i=0..NumExtSubPicMinus1
    If(subpic_ctu_top_left_x[ i ]<MinTopLeftX)
       MinTopLeftX= subpic_ctu_top_left_x[ i ]
    If(subpic_ctu_top_left_y[ i ]<MinTopLeftY)
       MinTopLeftY= subpic_ctu_top_left_y[ i ]
    If(subpic_ctu_top_left_x[ i ]+ subpic_width_minus1[ i ]>MaxBottomRightX)
       MaxBottomRightX= subpic_ctu_top_left_x[ i ]+ subpic_width_minus1[ i ]
    If(subpic_ctu_top_left_y[ i ]+ subpic_height_minus1[ i ]> MaxBottomRightY)
       MaxBottomRightY= subpic_ctu_top_left_y[ i ]+ subpic_height_minus1[ i ]
```

Then with this values, the maximum picture size can be derived, as well as the new values of subpic_ctu_top_left_x [i], subpic_ctu_top_left_y[i] of each of the extracted subpictures by subtracting the respective values of MinTopLeftX or MinTopLeftY.

In an alternative embodiment, signalling is provided that allows for rewriting parameter sets and picture headers without the need or deriving the discussed values. For each potential combination of subpicture to be extracted, the picture size could be provided that needs to be rewritten in the parameter sets. This could be done in a form of SEI message for example. The SEI message could include a parameter_type syntax element that would indicate what information is inside that helps re-writing. E.g., type 0 could be picture size, type 1 level of the extracted bitstream, type 2 information in the picture header, combinations thereof, etc.

In other words, subpicture extraction is performed on a data stream which has a plurality of pictures of a video encoded thereinto in a plurality of layers, wherein each of the plurality of pictures of all layers is split into a predetermined number of subpictures, each subpicture comprising boundaries for boundary extension for motion compensation. The subpicture extraction is performed on the data stream to an extracted data stream related to one or more subpictures of interest by dropping NAL units of the data The subpicture extraction can be performed such that the extracted data stream consists of extracted sets of subpictures, which are rectangular in that each of them corresponds to a rectangular region in the data stream.

Among the rewritable values are subpicture width in luma samples, subpicture height in luma samples, level information, HRD-related parameters, and picture size.

The following concerns emulation prevention obsoletion for sub_pic_id (5).

Subpicture IDs are signalled currently in VVC in the slice header. This is for instance illustrated in FIG. 22.

However, they are written as one of the first syntax elements in the slice header so that accessing to that value is easy. Note that an extraction process (or a merging process where the id needs to be changed/checked) would require to read and/or write the value of the subpicture ids and therefore easy access is desirable. One aspect that is still missing for easy accessibility to that value is emulation prevention. The syntax element slice_pic_order_cnt_lsb is at most 16 bits length and could take a value of 0, e.g. 0x0000. The length of slice_sub_pic_id is 16 bits. Therefore, some combinations of slice_pic_order_cnt_lsb and slice_sub_pic_id values could lead to emulation prevention happening, which would make it more complicated to parse the subpicture ids by upper layer applications and even more difficult to change or modify for upper layer applications, since the length of the prevention emulated slice_header could change if the value of slice_sub_pic_id is changed to a different value of slice_sub_pic_id*.

In one embodiment, the slice_pic_order_cnt_lsb is changed to slice_pic_order_cnt_lsb_plus1 and slice_sub_pic_id is changed to slice_sub_pic_id_plus1 so that there cannot happen in any case that there is emulation prevention happening between slice_pic_order_cnt_lsb and slice_sub_pic_id. This would help for slice_sub_pic_id parsing but would not provide a solution for use-cases in which the value of slice_sub_pic_id needs to be changed. Note that slice_sub_pic_id_plus1 does not ensure that the least significant bits for slice_sub_pic_id_plus1 in the last byte of the slice header containing slice_sub_pic_id_plus1 are not zero. Therefore, a 0x00 could happen at that byte which could trigger emulation prevention depending on the value of the syntax element in the following 2 bytes.

In another embodiment, a 1 one-bit syntax element follows the slice_sub_pic_id_plus1 as in the example of FIG. 23, which would solve the described problem.

Obviously, the provided solutions come along with an overhead, e.g. an additional one bit and x_plus1 syntax elements. Besides, the described problems arise only:

For emulation prevention happening between slice_pic_order_cnt_lsb and slice_sub_pic_id: when the length of both syntax elements together is bigger than 24 bits.

For emulation prevention happening with slice_sub_pic_id_plus1 and following syntax elements: when slice_sub_pic_id_plus1 spans over more than one byte.

Since the described problem may not happen very often, the described change could be conditioned to some gating flags in either parameter sets of picture header. This is for instance illustrated in FIG. 24, wherein Val (the offset to the subpiuc id) is determined from the combined coded length of slice_pic_order_cnt_lsb_plus1 and slice_subpic_id_plusVal as follows:

Val=codedLength(slice_pic_order_cnt_lsb_plus1+
slice_subpic_id_plusVal)<31?1:4.

This reads as Val is set to the value of "one", if the coded length of slice_pic_order_cnt_lsb_plus1 and slice_subpic_id_plusVal is together shorter than 31 bit, and to the value of "four" else.

The following concerns CABAC zero words (6).

cabac_zero_word may be inserted at the end of each slice. They can be positioned in any of the slices of a picture. The current video specification describes a constraint for the picture level, that ensures that cabac_zero_words are to be inserted if the bin-to-bit ratio is too high.

When subpictures are extracted, and these are indicated to conform to a specific profile and level, it should be a requirement that the following condition that applies to the AU also applies to each of the subpictures individually:

Let the variable RawMinCuBits be derived as follows:

RawMinCuBits=MinCbSize$Y$*MinCbSize$Y$*(BitDepth+2*BitDepth/(SubWidth$C$*SubHeight$C$))

The value of BinCountsInNalUnits shall be less than or equal to (32÷3)*NumBytesInVclNalUnits+(RawMinCuBits*PicSizeInMinCbs$Y$)÷32.

Therefore, a bitstream constraint or an indication shows that each subpicture individually fulfils the condition described above.

As a first embodiment, a flag could be signalled as a constraint flag that indicates that subpictures fulfil the constraint mentioned. This is for instance illustrated in FIG. 25.

In another embodiment the fulfilment of such a constraint is based on one or both of the following conditions:
1) The subpicture has subpic_treated_as_pic_flag equal to 1
2) The bitstream contains a level conformance indication of the subpicture, e.g. by means of an SEI message (existing subpic_level_info SEI message).

In other words, in encoding a plurality of pictures of a video into a data stream, wherein each of the plurality of pictures is split into a predetermined number of subpictures and each subpicture comprises boundaries for boundary extension for motion compensation, each of the subpictures can be encoded using context-adaptive binary arithmetic coding.

For that, the data stream is provided for at least one subpicture at the end of one or more slices or VCL NAL units of each subpicture with zero-words so as to avoid that any of the subpictures exceeds a predetermined bin-to-bit ratio.

As can be seen in FIG. 26, an encoder can produce a bitstream 2605 in the following manner. Fractions of two access units 2620 or 2630 are exemplarily shown. Each of them has a picture encoded thereinto subdivided into subpictures as exemplarily shown for the pictures in FIG. 19. However, FIG. 26 concentrates on those portions of bitstream relating to exactly one subpicture of each picture. For AU 2621, the encoding has exemplarily led to only one slice 2621 into which the subpicture of the picture of that AU 2610 has been coded, and in case of AU 260 three slices resulted, namely 2631, 2632 and 2633 into which a subpicture of that AU 2630 has been coded.

The encoder uses binary arithmetic coding such as CABAC. That is, it encodes syntax elements generated to described the video or the pictures' content by using syntax elements. Those not yet binary valued are binarized into bin strings. Thus, the pictures are encoded into syntax elements which, in turn, are encoded into a sequence of bins, which, in turn, are arithmetically coded into the data stream, thereby resulting into portions of the bitstream each of which has a certain portion of the video encoded thereinto, such as a subpicture. This portion consumes a certain number of bits which, in turn, have been generated by arithmetically coded a certain number if bins, which yields the bin to-bit ratio. The decoder does the inverse: the portion associated with one subpicture is arithmetically decoded to yield the sequence of bins which, in turn, are debinarized to yield the syntax elements from which, in turn, the decoder may reconstruct the subpicture Thus, "bin" in "bin-to-bit ratio" represents the number of bits or digits of the binarized symbols to be coded and "bit" represents the number of written/read bits of the CABAC bitstream.

In order to avoid to exceed a predetermined bin-to-bit ratio, the encoder checks, for each subpicture, the bin-to-bit ratio of the CABAC coded portion of the one or more slices into which the respective subpicture has been coded, and if the ratio is too high, feeds the CABAC encoding engine with as many zero-words to be CABAC coded at the end of one or more of the one or more slices in which the respective subpicture is coded, so that the ration is no longer exceeded. These cabac zero words are indicated in FIG. 26 by zeros, i.e. "0". They may be are either added at the end of a subpicture 2621, i.e. at the end of the last slice, or in a manner distributed onto the ends of one or more of the slices 2631, 2632, and 2633 of a subpicture. That is, while FIG. 26 shows the distributed variant in FIG. 26, the zero-word could alternatively be appended at the end of the last slice 2613 completely.

The data stream 2605, when reaching a decoder 2640, leads to the decoder decoding the data stream, or at least the portion thereof relating to the subpicture just-mentioned, and parses the corresponding data portions within AUs 2620 and 2630: In doing so, the decoder 2640 can determined the amount or number of zero-words, coded at the end of one or more slices of a certain subpicture by determining how many zero-words are needed to not exceed the bin-to-bit-ratio and can discard the cabac zero words. It would, however, also be possible that the decoder 2640 is able to parse the slices in manner so as to be able to distinguish zero words from other syntax elements by other means, to discard the zero words then. That is, the decoder may or may not check the bin-to-bit ratio of the one or more slices of a certain subpicture in order to continue to CABAC decode as many zero words needed to get the ratio into certain predetermined range. If not, the decoder is able to distinguish zero-words having been CABAC decoded, from other syntax elements syntactically.

In case the ratio condition is not met, the decoder 2640 might fall into a certain error mode and a predetermined error handling might be triggered by the decoder.

Finally, it is noted that number of subpictures can be any number. In other words, at least one can in particular mean two or more subpictures.

Each subpicture can be evaluated for an independence property, e.g. subpic_treated_as_pic_flag, and/or for corresponding level conformance indication, e.g. in a supplemental enhancement information, SEI, message. The zero-words can then be provided for a subpicture only in response to and in accordance with the evaluation.

The data stream can be provided at the end of one or more slices of each subpicture of the at least one subpicture with the zero-words such that the number of bins coded for the respective subpicture into the data stream using the context adaptive arithmetic coding is less than or equal to a number determined using a product between a predetermined factor and a byte length of one or more VCL NAL units of the data stream associated with the respective subpicture.

The data stream can also be provided at the end of one or more slices of each subpicture of the at least one subpicture with the zero-words such that the number of bins coded for the respective subpicture into the data stream using the context adaptive arithmetic coding is less than or equal to a number determined using a sum of a first product between a first predetermined factor and a byte length of one or more VCL NAL units of the data stream associated with the respective subpicture and a second product between a second predetermined factor, a minimum number of bits per coding block and a number of coding blocks the respective subpicture is composed of.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive data stream can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

The embodiments described above are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

The invention claimed is:

1. An encoder for encoding a picture of a video into a data stream, the picture comprising a plurality of subpictures, the encoder comprising:
    at least one hardware processor configured for encoding, into the data stream, a first subpicture of the plurality of subpictures such that BinCountsInNalUnits for the first subpicture is less than or equal to $(32 \div 3)*$NumBytesInVclNalUnits+ (RawMinCuBits*PicSizeInMinCbsY)$\div$ 32, the encoding of the first subpicture comprising:
        encoding a value of 1 for a subpic_treated_as_pic_flag associated with the first subpicture,
        determining that BinCountsInNalUnits for the first subpicture is greater than $(32\div3)*$NumBytesInVclNalUnits+(RawMinCuBits*PicSizeInMinCbsY)$\div$32, where RawMinCuBits=MinCbSizeY*MinCbSizeY*(BitDepth+2*BitDepth/(SubWidthC*SubHeightC)), and
        based on the value of 1 for the subpic_treated_as_pic_flag associated with the first subpicture and the determining that BinCountsInNalUnits for the first subpicture is greater than $(32\div3)*$NumBytesInVclNalUnits+(RawMinCuBits*PicSizeInMinCbsY)$\div$32, adding one or more cabac_zero_words to the data stream until BinCountsInNalUnits for the first subpicture is less than or equal to $(32\div3)*$NumBytesInVclNalUnits+(RawMinCuBits*PicSizeInMinCbsY)$\div$32.

2. The encoder of claim 1, wherein the encoding of the picture comprises encoding into the data stream, a second subpicture of the plurality of subpictures such that BinCountsInNalUnits for the second subpicture is less than or equal to $(32\div3)*$NumBytesInVclNalUnits+(RawMinCuBits*PicSizeInMinCbsY)$\div$32.

3. The encoder of claim 1, wherein the at least one hardware processor is further configured for:
    encoding into the data stream, a second subpicture of the plurality of subpictures such that BinCountsInNalUnits for the second subpicture is less than or equal to $(32\div3)*$NumBytesInVclNalUnits+(RawMinCuBits*PicSizeInMinCbsY)$\div$32.

4. The encoder of claim 3, wherein the encoding of the second subpicture comprises encoding a value of 1 for a subpic_treated_as_pic_flag associated with the second subpicture.

5. The encoder of claim 4, wherein the encoding of the second subpicture comprises:
    determining that BinCountsInNalUnits for the second subpicture is greater than $(32\div3)*$NumBytesInVclNalUnits+(RawMinCuBits*PicSizeInMinCbsY)$\div$32, where RawMinCuBits=MinCbSizeY*MinCbSizeY*(BitDepth+2*BitDepth/(SubWidthC*SubHeightC)); and
    based on the value of 1 for the subpic_treated_as_pic_flag associated with the second subpicture and the determination that BinCountsInNalUnits for the second subpicture is greater than $(32\div3)*$NumBytesInVclNalUnits+(RawMinCuBits*PicSizeInMinCbsY)$\div$32, adding one or more cabac_zero_words to the data stream until BinCountsInNalUnits for the second subpicture is less than or equal to $(32\div3)*$NumBytesInVclNalUnits+(RawMinCuBits*PicSizeInMinCbsY)$\div$32.

6. A decoder for decoding a picture from a video bitstream, the picture comprising a plurality of subpictures, the decoder comprising:
    at least one hardware processor configured for decoding, from the video bitstream, a first subpicture of the plurality of subpictures such that BinCountsInNalUnits for the first subpicture is less than or equal to $(32\div3)*$NumBytesInVclNalUnits+(RawMinCuBits*PicSizeInMinCbsY)$\div$32, the decoding of the first subpicture comprising:
        decoding a value of 1 for a subpic_treated_as_pic_flag associated with the first subpicture,
        determining that BinCountsInNalUnits for the first subpicture is greater than $(32\div3)*$NumBytesInVclNalUnits+(RawMinCuBits*PicSizeInMinCbsY)$\div$32, where RawMinCuBits=MinCbSizeY*MinCbSizeY*(BitDepth+2*BitDepth/(SubWidthC*SubHeightC)), and
        based on the value of 1 for the subpic_treated_as_pic_flag associated with the first subpicture and the determining that BinCountsInNalUnits for the first subpicture is greater than $(32\div3)*$NumBytesInVclNalUnits+(RawMinCuBits*PicSizeInMinCbsY)$\div$32, inserting one or more cabac_zero_words until BinCountsInNalUnits for the first subpicture is less than or equal to $(32\div3)*$NumBytesInVclNalUnits+(RawMinCuBits*PicSizeInMinCbsY)$\div$32.

7. The decoder of claim 6, wherein the plurality of subpictures comprises a second subpicture such that BinCountsInNalUnits for the second subpicture is less than or equal to $(32\div3)*$NumBytesInVclNalUnits+(RawMinCuBits*PicSizeInMinCbsY)$\div$32.

8. An method for encoding a picture of a video into a data stream, the picture comprising a plurality of subpictures, the method comprising:
    encoding, into the data stream, a first subpicture of the plurality of subpictures such that BinCountsInNalUnits for the first subpicture is less than or equal to $(32\div3)*$NumBytesInVclNalUnits+(RawMinCuBits*PicSizeInMinCbsY)$\div$32, the encoding of the first subpicture comprising:
        encoding a value of 1 for a subpic_treated_as_pic_flag associated with the first subpicture,
        determining that BinCountsInNalUnits for the first subpicture is greater than $(32\div3)*$NumBytesInVclNalUnits+(RawMinCuBits*PicSizeInMinCbsY)$\div$32, where RawMinCuBits=MinCbSizeY*MinCbSizeY*(BitDepth+2*BitDepth/(SubWidthC*SubHeightC)), and
        based on the value of 1 for the subpic_treated_as_pic_flag associated with the first subpicture and the determining that BinCountsInNalUnits for the first subpicture is greater than $(32\div3)*$NumBytes- InVclNalUnits+(RawMinCuBits*PicSizeIn-MinCbsY)÷32, adding one or more cabac_zero_words to the data stream until BinCountsInNalUnits for the first subpicture is less than or equal to (32÷3)*NumBytesInVclNalUnits+(RawMinCuBits*PicSizeInMinCbsY)÷32.

9. The method of claim 8, wherein the step of encoding the picture of the video into the data stream comprises encoding into the data stream, a second subpicture of the plurality of subpictures such that BinCountsInNalUnits for the second subpicture is less than or equal to (32÷3)*NumBytesInVclNalUnits+(RawMinCuBits*PicSizeInMinCbsY)÷32.

10. A non-transitory computer-readable medium having program code stored thereon, which when run on a computer is configured to perform the method of claim 8.

11. A method for decoding a picture from a video bitstream, the picture comprising a plurality of subpictures, the method comprising:

decoding, from the video bitstream, a first subpicture of the plurality of subpictures such that BinCountsInNalUnits for the first subpicture is less than or equal to (32÷3)*NumBytesInVclNalUnits+(RawMinCuBits*PicSizeInMinCbsY)÷32, the decoding of the first subpicture comprising:

decoding a value of 1 for a subpic_treated_as_pic_flag associated with the first subpicture, determining that BinCountsInNalUnits for the first subpicture is greater than (32÷3)*NumBytesInVclNalUnits+(RawMinCuBits*PicSizeInMinCbsY)÷32, where RawMinCuBits=MinCbSizeY*MinCbSizeY*(BitDepth+2*BitDepth/(SubWidthC*SubHeightC)), and based on the value of 1 for the subpic_treated_as_pic_flag associated with the first subpicture and the determining that BinCountsInNalUnits for the first subpicture is greater than (32÷3)*NumBytesInVclNalUnits+(RawMinCuBits*PicSizeInMinCbsY)÷32, inserting one or more cabac_zero_words until BinCountsInNalUnits for the first subpicture is less than or equal to (32÷3)*NumBytesInVclNalUnits+(RawMinCuBits*PicSizeInMinCbsY)÷32.

12. The method claim 11, wherein the plurality of subpictures comprises a second subpicture such that BinCountsInNalUnits for the second subpicture is less than or equal to (32÷3)*NumBytesInVclNalUnits+(RawMinCuBits*PicSizeInMinCbsY)÷32.

13. A non-transitory computer-readable medium having program code stored thereon, which when run on a computer is configured to perform the method of claim 11.

* * * * *